US012794743B2

(12) United States Patent
Yapici et al.

(10) Patent No.: US 12,794,743 B2
(45) Date of Patent: Nov. 10, 2026

(54) OVERLAID FREQUENCY-DOMAIN REFLECTION MODULATION

(71) Applicant: QUALCOMM Incorporated, San Diego, CA (US)

(72) Inventors: Yavuz Yapici, Florham Park, NJ (US); Juergen Cezanne, Ocean Township, NJ (US); Junyi Li, Greentown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/057,779

(22) Filed: Feb. 19, 2025

(65) Prior Publication Data

US 2026/0246672 A1 Aug. 20, 2026

(51) Int. Cl.
*H04L 27/12* (2006.01)
*H04L 27/16* (2006.01)

(52) U.S. Cl.
CPC .............. *H04L 27/12* (2013.01); *H04L 27/16* (2013.01)

(58) Field of Classification Search
CPC ................................ H04L 27/12; H04L 27/16
USPC ........................................................... 375/262
See application file for complete search history.

(56) References Cited

U.S. PATENT DOCUMENTS 9,473,983 B1 * 10/2016 Gerdes .................... H04L 27/00
2014/0153621 A1 6/2014 Bremer
2016/0365890 A1 12/2016 Reynolds et al.
2021/0118452 A1 * 4/2021 Tsingos ................... H04S 7/302
2022/0021412 A1 * 1/2022 Iwai ..................... H04B 1/7073
(Continued)

FOREIGN PATENT DOCUMENTS

WO 2024152278 A1 7/2024

OTHER PUBLICATIONS

Talla V., et al., "LoRa Backscatter: Enabling the Vision of Ubiquitous Connectivity", Proceedings of the ACM on Interactive, Mobile, Wearable and Ubiquitous Technologies, vol. 1, No. 3, Article 105, Sep. 2017, 24 Pages.
(Continued)

*Primary Examiner* — Emmanuel Bayard
(74) *Attorney, Agent, or Firm* — QUALCOMM Incorporated

(57) ABSTRACT

Overlaid frequency-domain reflection modulation is described. An apparatus is configured to shift a first order harmonic, with respect to an associated transmission signal, to a shifted frequency-domain position. The apparatus is configured to encode, based on the shifted frequency-domain position, an information bit over time-domain modulated information to generate an overlaid modulation information bit. The apparatus is configured to transmit, for a receiver and in accordance with a single sideband reflection, the overlaid modulation information bit. Another apparatus is configured to receive, from a transmitter and in accordance with a single sideband reflection, an overlaid modulation information bit based on a shifted first order harmonic, of an associated transmission signal, at a shifted frequency-domain position. The apparatus is configured to decode, based on the shifted frequency-domain position for the shifted first order harmonic, the overlaid modulation information bit in association with time-domain modulated information to generate an information bit.

30 Claims, 14 Drawing Sheets

(56) References Cited

U.S. PATENT DOCUMENTS

| | | | | |
|---|---|---|---|---|
| 2023/0171053 | A1* | 6/2023 | Taghizadeh Motlagh | H04L 5/0051 370/252 |
| 2025/0015913 | A1* | 1/2025 | Yapici | H04B 7/04013 |
| 2025/0247277 | A1* | 7/2025 | MolavianJazi | H04L 27/02 |

OTHER PUBLICATIONS

Zhang P., et al., "HitchHike: Practical Backscatter Using Commodity WiFi", SenSys '16: Proceedings of the 14th ACM Conference on Embedded Network Sensor Systems, Nov. 2016, pp. 259-271 (13 Pages).

Co-pending U.S. Appl. No. 19/036,497, inventor Yapici; Yavuz, filed Jan. 24, 2025.

Elmossallamy M. A., et al., "Noncoherent Frequency-Shift Keying for Ambient Backscatter Over OFDM Signals", IEEE Open Journal of the Communications Society, vol. 5, 6 Pages, Aug. 14, 2024, pp. 5219-5231, XP093378748, sections II, III.A figure 2.

International Search Report and Written Opinion—PCT/US2026/014532—ISA/EPO—Sep. 2, 2026.

Janjua M. B., et al., "Improving Interference Immunity for Backscatter Communications in OFDM-Based Symbiotic Radio", GLOBECOM 2024—2024 IEEE Global Communications Conference IEEE, Dec 8, 2024, pp. 2677-2682, XP034856116, sections II, III, IV.

Partial International Search Report—PCT/US2026/014532—ISA/EPO—Jun. 15, 2026.

Sankhe K., et al., "Talking When No One is Listening: Piggybacking City-Scale IoT Control Signals Over LTE", IEEE Conference on Computer Communications (INFOCOM), Apr. 16, 2018, XP033418242, pp. 1547-1555, section II, figures 4, 5.

* cited by examiner

OVERLAID FREQUENCY-DOMAIN REFLECTION MODULATION

TECHNICAL FIELD

The present disclosure relates generally to communication systems, and more particularly, to wireless systems utilizing reflection modulation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR, for example, includes services associated with enhanced mobile broadband (eMBB), massive machine type communications (mMTC), and ultra-reliable low latency communications (URLLC). Some aspects of 5G NR may be based on the 4G Long Term Evolution (LTE) standard, and some aspects of later technologies may be based on 5G NR. There exists a need for further improvements in 5G NR technology and future technologies. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be or may comprise a transmitter device. The apparatus is configured to shift a first order harmonic, with respect to an associated transmission signal, to a shifted frequency-domain position. The apparatus is configured to encode, based on the shifted frequency-domain position for the first order harmonic, an information bit over time-domain modulated information to generate an overlaid modulation information bit. The apparatus is configured to transmit, for a receiver device and in accordance with a single sideband reflection, the overlaid modulation information bit.

In the aspect, the method includes shifting a first order harmonic, with respect to an associated transmission signal, to a shifted frequency-domain position. The method includes encoding, based on the shifted frequency-domain position for the first order harmonic, an information bit over time-domain modulated information to generate an overlaid modulation information bit. The method includes transmitting, for a receiver device and in accordance with a single sideband reflection, the overlaid modulation information bit.

In an aspect of the disclosure, a method, a computer-readable medium, and an apparatus are provided. The apparatus may be or may comprise a receiver device. The apparatus is configured to receive, from a transmitter device and in accordance with a single sideband reflection, an overlaid modulation information bit based on a shifted first order harmonic, of an associated transmission signal, at a shifted frequency-domain position. The apparatus is configured to decode, based on the shifted frequency-domain position for the shifted first order harmonic, the overlaid modulation information bit in association with time-domain modulated information to generate an information bit.

In the aspect, the method includes receiving, from a transmitter device and in accordance with a single sideband reflection, an overlaid modulation information bit based on a shifted first order harmonic, of an associated transmission signal, at a shifted frequency-domain position. The method includes decoding, based on the shifted frequency-domain position for the shifted first order harmonic, the overlaid modulation information bit in association with time-domain modulated information to generate an information bit.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
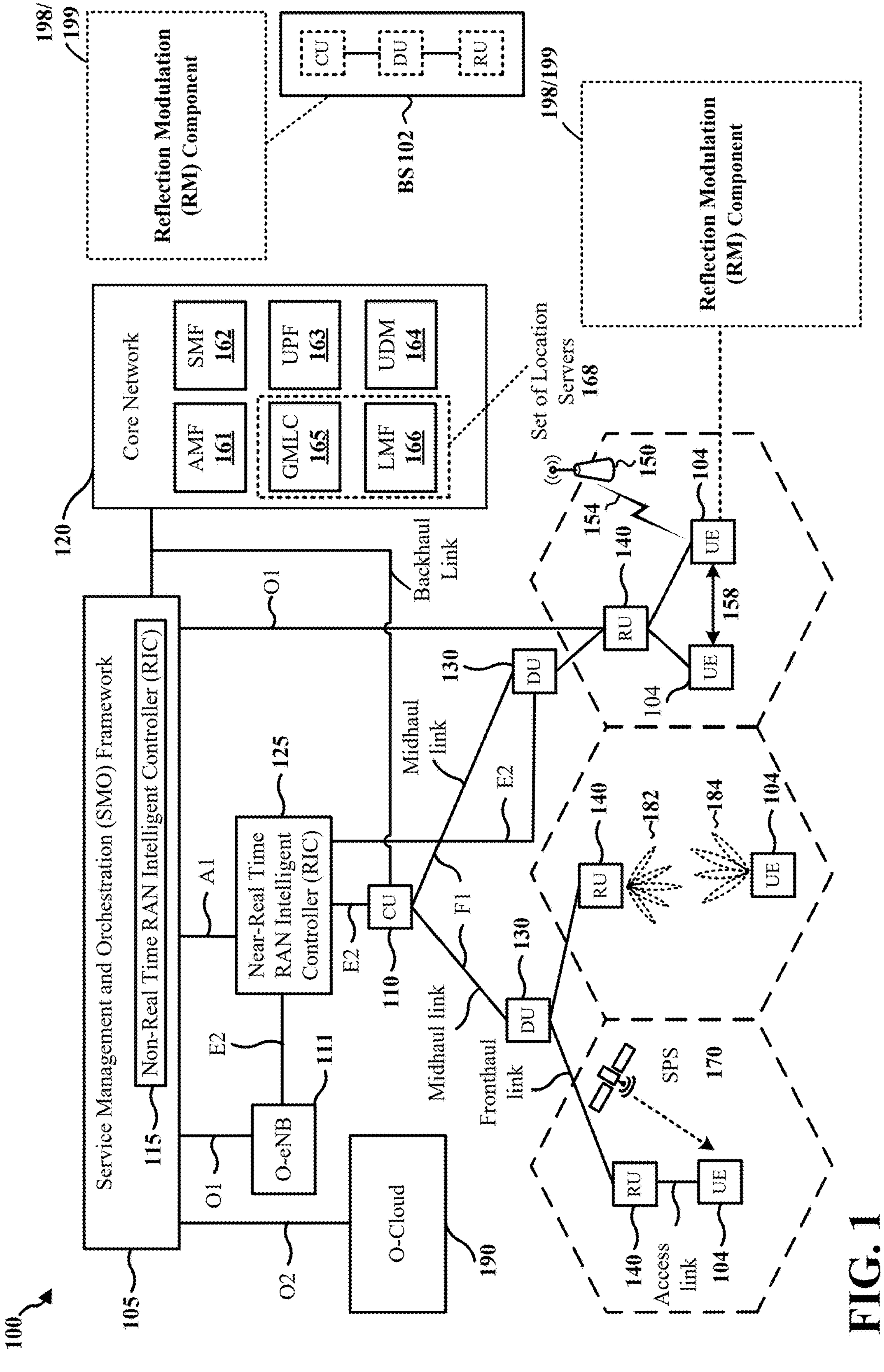
FIG. 1 is a diagram illustrating an example of a wireless communications system and an access network.

Wireless communication networks may be designed to support communications between network nodes (e.g., base stations, gNBs, etc.), UEs, etc. Some wireless communication may include or be based on reflection modulation (RM), which is a technique for various low-power or battery-less network nodes leveraging backscattering communication principles, e.g., ambient IoT (A-IoT) tags, other backscatter devices, or reconfigurable intelligent surfaces (RISs), among other examples. Some examples may perform RM by periodic waveforms that govern switching patterns of the antenna loads and induce the desired phase shift on the reflected wave. Other examples of RM may map data to subcarrier indices and shift frequency spectrums accordingly by adjusting the chip rate (e.g., a rate at which a reflecting antenna load switches from one value to another).

However, changes in chip rates and expenditures of excess energy associated with harmonic frequencies above the first order in existing solutions reduce efficiency in RM. Aspects presented herein provide single sideband reflection techniques for reflection nodes to eliminate image tones of first order harmonics and provide RM without changes in chip rates.

Various aspects relate generally to wireless systems utilizing RM. Some aspects more specifically relate to overlaid frequency-domain reflection modulation. In some examples, a transmitter device may be configured to notify a receiver device about future overlaid modulation information bits. The transmitter device may shift a first order harmonic, with respect to an associated transmission signal, to a shifted frequency-domain position, and then encode, based on the shifted frequency-domain position for the first order harmonic, an information bit over time-domain modulated information to generate an overlaid modulation information bit. The transmitter device may transmit, and the receiver devices may receive, the overlaid modulation information bit in accordance with a single sideband reflection, such as via a network node (e.g., a passive/low-power network node such as an RIS, A-IoT tags, etc.). The receiver device may then decode, based on the shifted frequency-domain position for the shifted first order harmonic, the overlaid modulation information bit in association with time-domain modulated information to generate an information bit.

Particular aspects of the subject matter described in this disclosure can be implemented to realize one or more of the following potential advantages. In some examples, by utilizing the location of a first order harmonic for waveforms (e.g., left-shifted/the lower sideband (LSB) or right-shifted/the upper sideband (USB)) of the original spectrum, the described techniques can be used to overlay information bits in existing time domain modulations. In some examples, by utilizing frequency-shifts through harmonic frequencies, the described techniques can be used to eliminate image tones of first order harmonics and save power which would otherwise be wasted for transmitting image tones. In some examples, by encoding additional bits on top of existing time-domain modulation scheme in an overlaid fashion by a transmitter device, the described techniques can be used to retrieve the single modulated bit in the frequency domain by a receiver device while still performing demodulation in the time domain to retrieve other bits for its underlying RM scheme in the time domain.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, 6G systems, or other wireless communication systems, may be arranged in multiple manners with various components or constituent parts. In such a wireless communication system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. As an example, in 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. An operating band has been identified for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term “sub-6 GHz” or the like if used herein may broadly represent frequencies that may be less than 6 GHz, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may have a reflection modulation (RM) component 198 ("component 198") that may be configured to shift a first order harmonic, with respect to an associated transmission signal, to a shifted frequency-domain position. The component 198 may be configured to encode, based on the shifted frequency-domain position for the first order harmonic, an information bit over time-domain modulated information to generate an overlaid modulation information bit. The component 198 may be configured to transmit, for a receiver device and in accordance with a single sideband reflection, the overlaid modulation information bit. The component 198 may be configured to transmit, for the receiver device and prior to the overlaid modulation information bit, an overlaid modulation indication indicative of a future transmission of the overlaid modulation information bit. The component 198 may be configured to transmit, for a network node and prior to the overlaid modulation information bit, a modulation configuration indication indicative of a modulation configuration associated with the shifted frequency-domain position for a future transmission of the overlaid modulation information bit. In certain aspects, the UE 104 and/or the base station 102 may have a RM component 199 ("component 199") that may be configured to receive, from a transmitter device and in accordance with a single sideband reflection, an overlaid modulation information bit based on a shifted first order harmonic, of an associated transmission signal, at a shifted frequency-domain position. The component 199 may be configured to decode, based on the shifted frequency-domain position for the shifted first order harmonic, the overlaid modulation information bit in association with time-domain modulated information to generate an information bit. The component 199 may be configured to receive, from the transmitter device and prior to the overlaid modulation information bit, an overlaid modulation indication indicative of a future transmission of the overlaid modulation information bit. In aspects the component 198 and the component 199 may comprise a single, joint component, e.g., with combined functionality of both the component 198 and the component 199. Accordingly, aspects herein for overlaid frequency-domain reflection modulation provide for overlaying information bits in existing time domain modulations by utilizing the location of a first order harmonic for waveforms (e.g., left-shifted/LSB or right-shifted/USB) of the original spectrum, provide for eliminating image tones of first order harmonics and reducing power consumption utilizing frequency-shifts through harmonic frequencies, and provide for retrieving modulated bits in the frequency domain by a receiver device, while still performing demodulation in the time domain to retrieve other bits for its underlying RM scheme in the time domain, by encoding additional bits on top of existing time-domain modulation scheme in an overlaid fashion by a transmitter device.

Figure 2B:
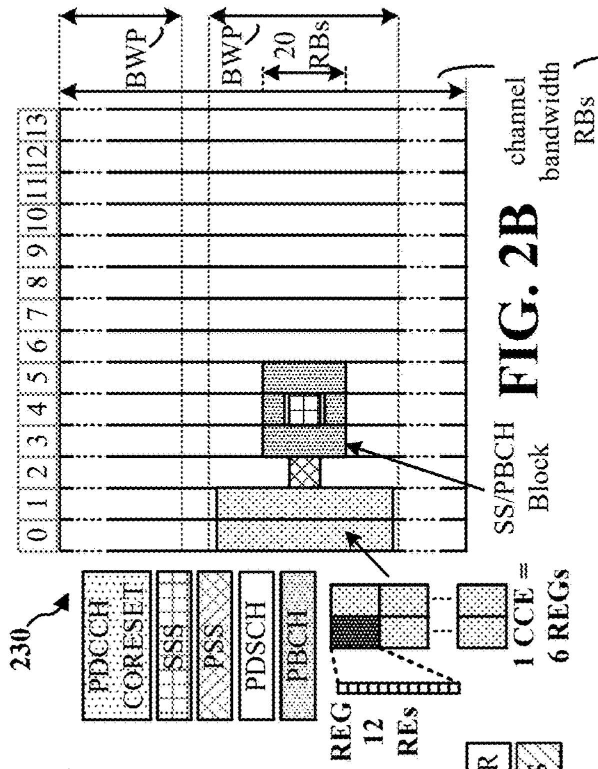
FIG. 2B is a diagram illustrating an example of downlink (DL) channels within a subframe, in accordance with various aspects of the present disclosure.
Figure 2D:
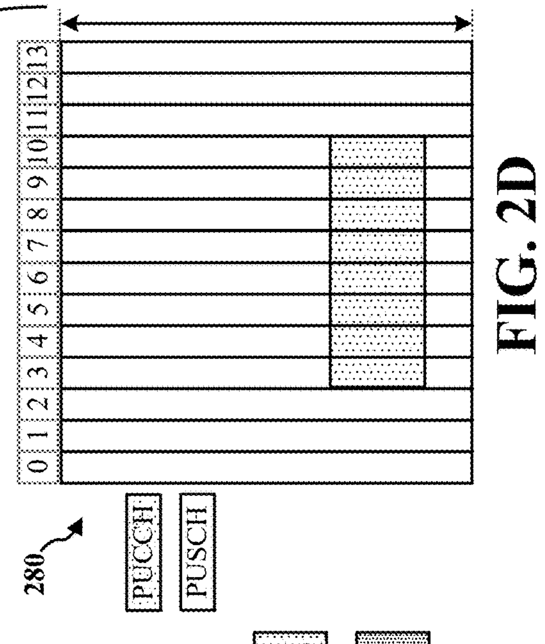
FIG. 2D is a diagram illustrating an example of uplink (UL) channels within a subframe, in accordance with various aspects of the present disclosure.
Figure 2A:
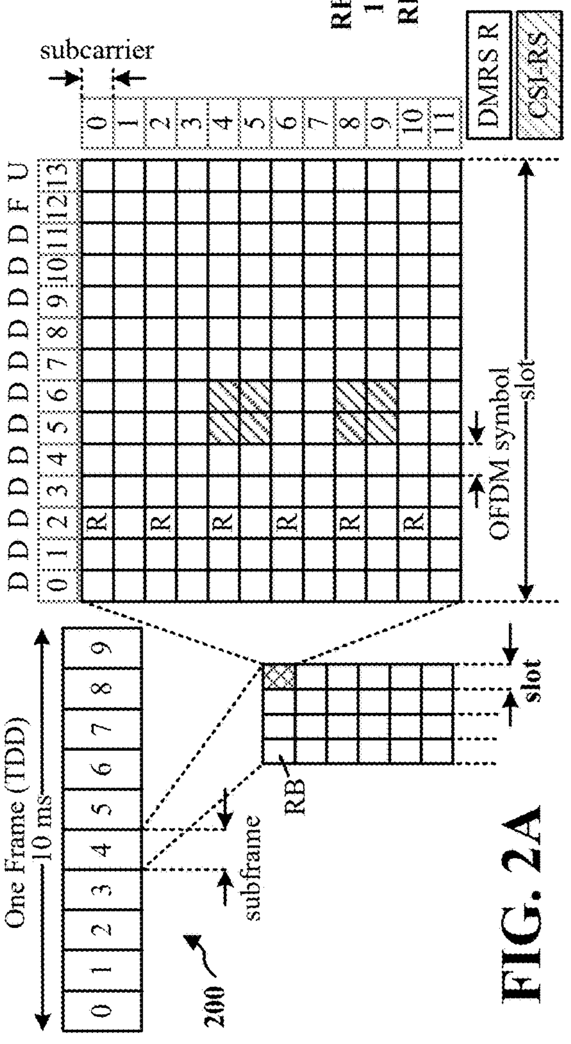
FIG. 2A is a diagram illustrating an example of a first frame, in accordance with various aspects of the present disclosure.
Figure 2C:
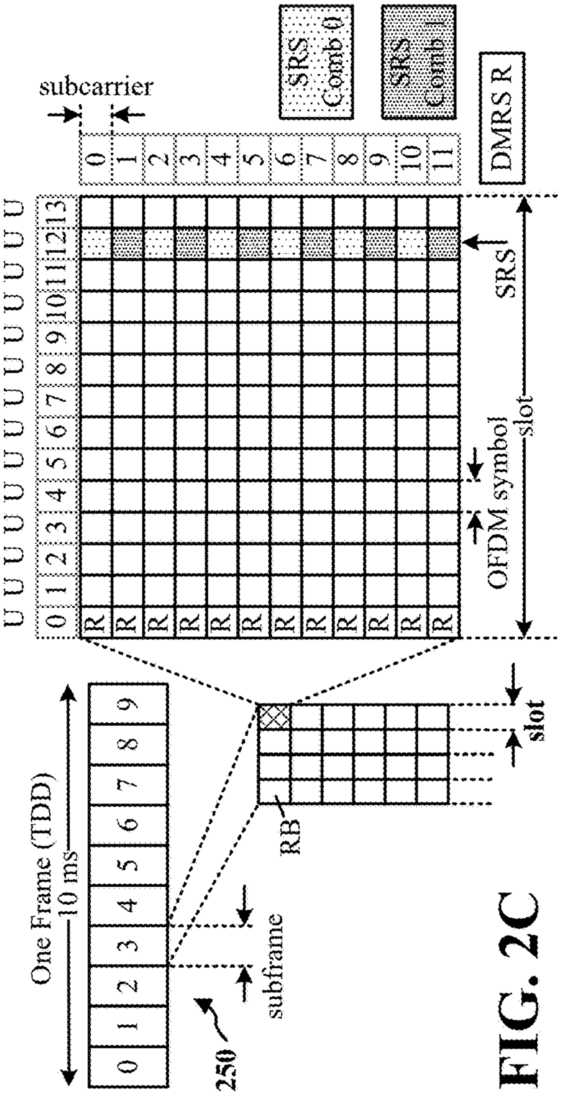
FIG. 2C is a diagram illustrating an example of a second frame, in accordance with various aspects of the present disclosure.

FIG. 2A is a diagram 200 illustrating an example of a first subframe within a 5G NR frame structure, which illustrates aspects that may be used in other wireless communication technologies, such as 6G or others. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to 2*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
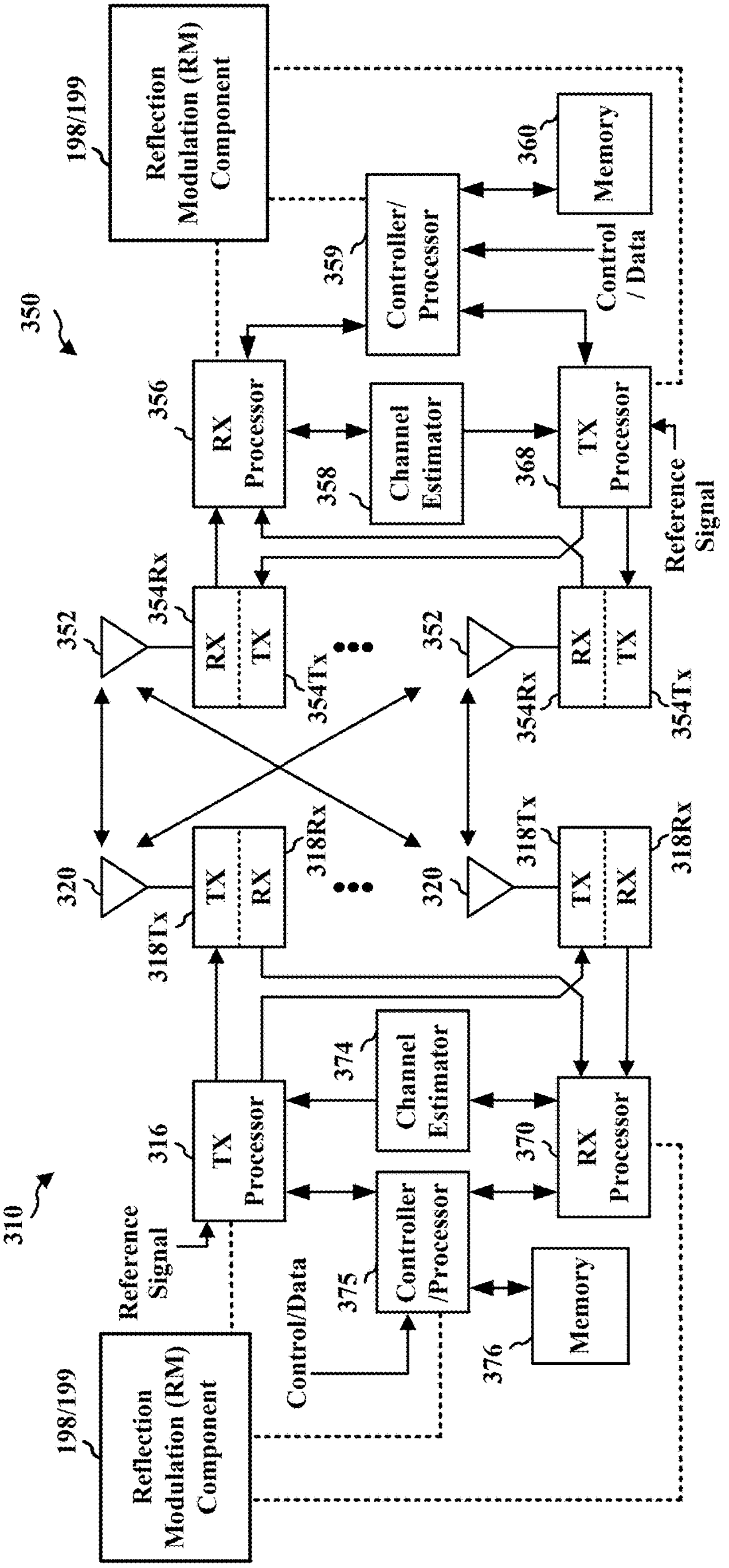
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 and/or the component 199 of FIG. 1.

At least one of the TX processor 316, the RX processor 370, and the controller/processor 375 may be configured to perform aspects in connection with the component 198 and/or the component 199 of FIG. 1.

RM is a technique for various low-power or battery-less network nodes leveraging backscattering communication principles, e.g., A-IoT tags or RISs, among other example of devices that may use backscattering communication principles. Some examples may perform RM by periodic waveforms that govern switching patterns of the antenna loads and induce the desired phase shift on the reflected wave. Other examples of RM may map data to subcarrier indices and shift frequency spectrums accordingly by adjusting the chip rate.

Figure 4:
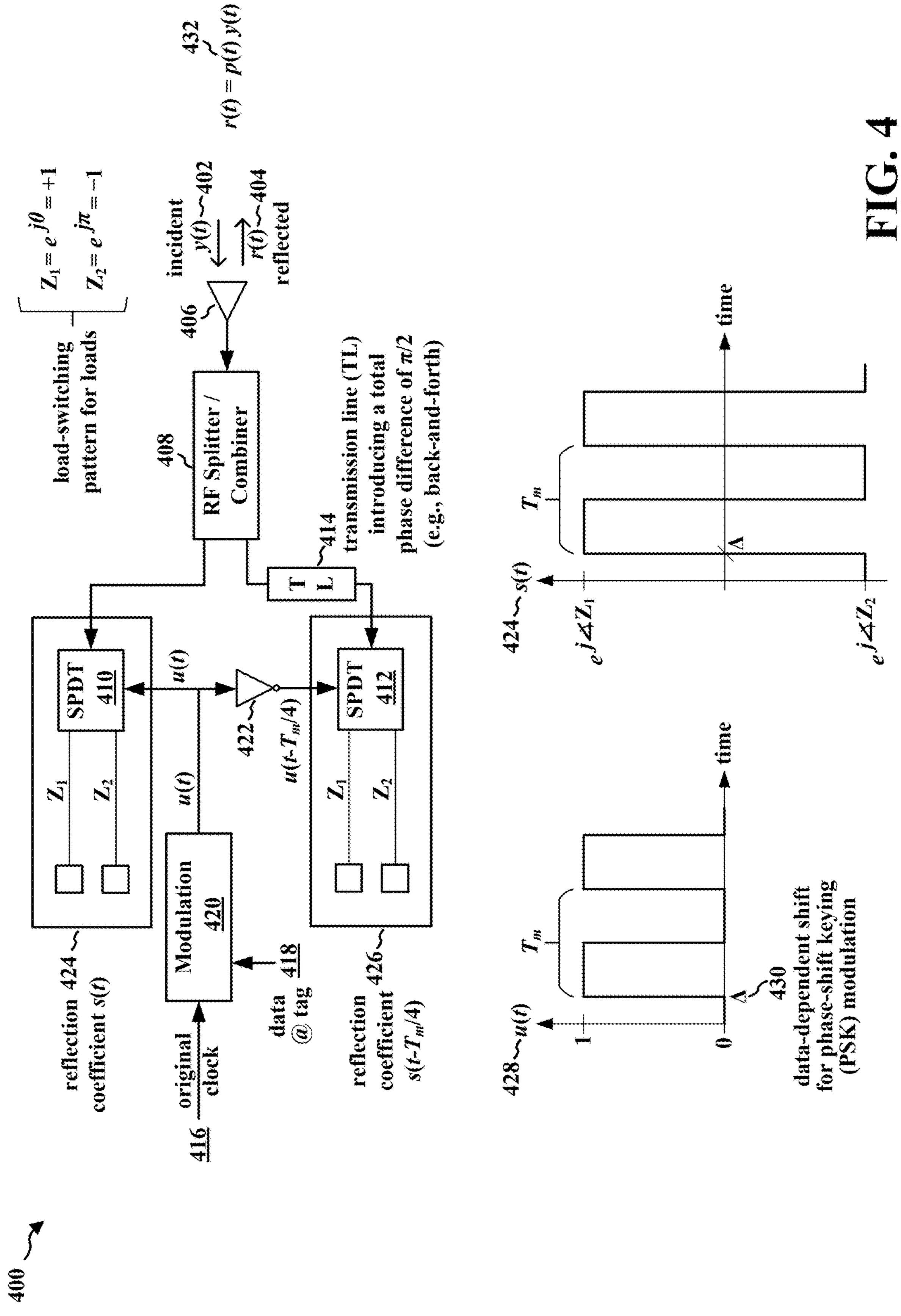
FIG. 4 is a diagram illustrating an example of single sideband reflection modulation.

FIG. 4 is a diagram 400 illustrating an example of single sideband reflection modulation. Diagram 400 shows a RM configuration in the context of an incident waveform 402 (y(t)) and a reflected waveform 404 (r(t)). Diagram 400 illustrates shifted copies of clocks that are used to eliminate one of the sidebands, e.g., one single sideband transmission.

The incident waveform 402 and the reflected waveform 404 may be received/reflected via an Rx/Tx component 406 (e.g., an RIS, an A-IoT tag, an antenna, etc.), and an RF splitter/combiner 408 may split the incident waveform 402. A first waveform of the split may be provided to a switch 410 (e.g., a single-pole double-throw (SPDT) switch), and a second waveform of the split may be provided to a switch 412 (e.g., a SPDT switch) via a transmission line (TL) 414. The TL 414 may introduce a phase difference (e.g., π/2) between incident waveform 402 and the reflected waveform 404, where a π/4 difference is associated with the reception of the incident waveform 402 and a π/4 difference is associated with the reflection of the reflected waveform 404 (e.g., a π/2 total phase difference).

The switch 410 and the switch 412 may activate between load-switching patterns $Z_1$ and $Z_2$ based on a modulation 420 that takes an original clock signal 416 and data 418 as inputs. A modulated waveform 428 (u(t)) may serve as a basis to the activate switch 410 and the switch 412, where the switch 412 activation is provided via an inverter 422 to complement the activation of the switch 410. The switch 410 may be associated with a reflection coefficient 424 (s(t)), and the switch 412 may be associated with a reflection coefficient 426 ($s(t-T_m/4)$), where $T_m$ is a modulation time, based on the phase difference introduced for the incident waveform 402 by the TL 414. The modulated waveform 428 (u(t)) is also shown as a waveform with respect to time having values of 0 (zero) and 1, having a period $T_m$, and having a data-dependent shift 430 ('Δ') for phase-shift keying (PSK) modulation. Additionally, the reflection coefficient 424 (s(t)) is also shown as a waveform with respect to time having values of $e^{j\angle Z_2}$ to $e^{j\angle Z_1}$, having the period $T_m$ and, and having the data-dependent shift 430 ('Δ').

An overall waveform 432 (p(t)) may be utilized to modulate the incident waveform 402 and to accomplish single sideband for the reflected waveform 404, e.g., r(t)=p(t)y(t). As unmodified, the base reflection coefficient associated with load-switching patterns $Z_1$ and $Z_2$, e.g., the reflection coefficient 424 (s(t)), may be represented as:

$$s(t) = \sum_{\substack{\ell=1 \\ \ell:\, odd}}^{\infty} \frac{4}{\pi\ell} \sin\left(\frac{2\pi\ell t}{T_m}\right)$$

where $\alpha_l$ represents $$\left(\frac{4}{\pi\ell}\right).$$

The overall waveform 432 (p(t)) may be generally represented as:

$$p(t) = s(t) + e^{j\pi/2} s(t - T_m/4)$$

where s(t) represents the original sequence (e.g., the reflection coefficient 424), $$e^{\frac{j\pi}{2}}$$

represents the phase difference introduced by the TL 414, and $$s\left(t - \frac{T_m}{4}\right)$$

represents the delayed sequence (e.g., the reflection coefficient 426). Taking the overall waveform 432 (p(t)) further, yields:

$$p(t) = \sum_{\substack{\ell=1 \\ \ell:\, odd}}^{\infty} a_\ell \left[\sin\left(\frac{2\pi\ell t}{T_m}\right) + j\sin\left(\frac{2\pi\ell(t - T_m/4)}{T_m}\right)\right]$$

and thus:

$$p(t) = \sum_{\substack{\ell=1 \\ \ell:\, odd}}^{\infty} a_\ell \left[\sin\left(\frac{2\pi\ell t}{T_m}\right) + jb_\ell \cos\left(\frac{2\pi\ell t}{T_m}\right)\right]$$

where:

$$b_\ell = \begin{bmatrix} -1, \ell = 1, 5, 9 \ldots \\ +1, \ell = 3, 7, 11 \ldots \end{bmatrix}$$

for the overall waveform 432 (p(t)).

The spectrum of the reflected waveform 404 may have a single component per harmonic frequency, and hence be single sideband. In this context, and from the relation r(t)=p(t)y(t), it may be shown in the frequency domain that:

$$R(f) = -\sum_{\ell=1,5,\ldots}^{\infty} ja_\ell Y\left(f - \frac{\ell}{T_m}\right) + \sum_{\ell=3,7,\ldots}^{\infty} ja_\ell Y\left(f + \frac{\ell}{T_m}\right)$$

where the spectrum of the incident waveform 402 may be shifted towards either the right or the left (e.g., one sideband per harmonic [*]) in alternating fashion for adjacent non-zero harmonics. Accordingly, for the overall waveform 432:

$$p(t) = \sum_{\ell=1,5,\ldots}^{\infty} a_\ell \left[\sin\left(\frac{2\pi\ell t}{T_m}\right) - j\cos\left(\frac{2\pi\ell t}{T_m}\right)\right] + \sum_{\ell=3,7,\ldots}^{\infty} a_\ell \left[\sin\left(\frac{2\pi\ell t}{T_m}\right) + j\cos\left(\frac{2\pi\ell t}{T_m}\right)\right]$$

where $$\left[\sin\left(\frac{2\pi\ell t}{T_m}\right) - j\cos\left(\frac{2\pi\ell t}{T_m}\right)\right] \rightarrow (-j)\left[\cos\left(\frac{2\pi\ell t}{T_m}\right) + j\sin\left(\frac{2\pi\ell t}{T_m}\right)\right]$$

and $$\left[\sin\left(\frac{2\pi\ell t}{T_m}\right)+j\cos\left(\frac{2\pi\ell t}{T_m}\right)\right]\rightarrow j\left[\cos\left(-\frac{2\pi\ell t}{T_m}\right)+j\sin\left(-\frac{2\pi\ell t}{T_m}\right)\right]$$

provide for $$p(t)=-\sum_{\ell=1,5,\ldots}^{\infty} ja_\ell e^{j\frac{2\pi\ell t}{T_m}}+\sum_{\ell=3,7,\ldots}^{\infty} ja_\ell e^{-j\frac{2\pi\ell t}{T_m}}$$

and $$s(t)=-\sum_{\substack{\ell=1\\ \ell:\,odd}}^{\infty}\frac{a_\ell}{2}\left(e^{j\frac{2\pi\ell t}{T_m}}-e^{-j\frac{2\pi\ell t}{T_m}}\right)$$

for single sideband RM.

However, as noted herein, changes in chip rates and expenditures of excess energy associated with harmonic frequencies above the first order in existing solutions reduces efficiency in RM. In contrast, the aspects described herein provide for single sideband reflection techniques to eliminate image tones of first order harmonics and provide RM without changes in chip rates.

Aspects herein for overlaid frequency-domain reflection modulation may target passive IoT devices/RISs with single sideband reflection transmission use cases. The aspects provide for methods to embed information bits (e.g., 1 bit information) to a signal/waveform by using different time delays to change the sideband of the signal/waveform, e.g., the original spectrum). By keeping either the upper SB (USB) or lower SB (LSB), aspects provide for conveyance of this 1 bit information from a transmitter to a receiver. In the overlaid frequency-domain reflection modulation aspects, for various reflection nodes, single sideband reflection techniques may be preferred to eliminate the image tone of the first order harmonic so that no energy is wasted with an undesired image tone. That is, aspects provide for single sideband reflections to move the desired first order harmonic to either the left, e.g., the LSB, or to the right, e.g., the USB, of the original spectrum while cancelling the image tone in either case. Aspects herein provide for reflection modulation techniques that use the location of the first order harmonic, e.g., for either the LSB or the USB, to encode additional bits (e.g., 1 additional information bit, in aspects) on top of an existing time-domain modulation scheme in an overlaid fashion. In other words, modulation in the described aspects may be configured in both time and frequency without the one harming the other. The receiver device may determine the location of the first harmonics to retrieve the single modulated bit in the frequency domain, while it still performs demodulation in the time domain to retrieve other bits for its underlying RM scheme. Aspects may also utilize double sideband (DSB) transmissions interchangeably with single sideband transmissions for synchronization purposes. RM techniques may be utilized, by way of example, in 5G NR, 6G, and beyond, for low-power network nodes which may have special interest for 6G systems, e.g., A-IoT and RIS, and effective reflective modulation schemes are therefore of interest for 6G and beyond for Tx and Rx ends of such communications.

Figure 5:
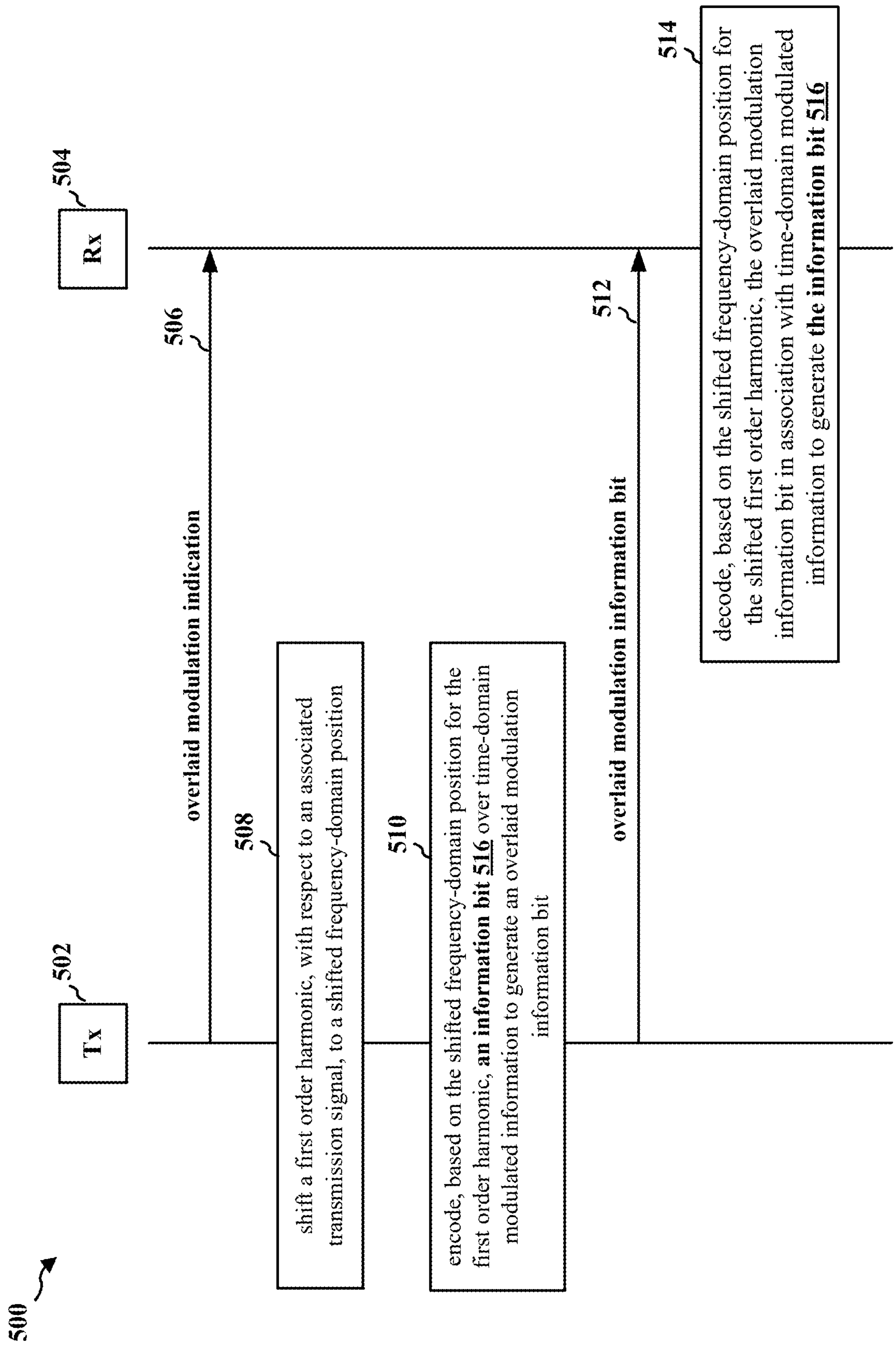
FIG. 5 is a call flow diagram for wireless communications, in accordance with various aspects of the present disclosure.

FIG. 5 is a call flow diagram 500 for wireless communications, in various aspects. Call flow diagram 500 illustrates overlaid frequency-domain reflection modulation for a transmitter device 502 (Tx) that communicates with a receiver device 504 (Rx), e.g., for transmission/reception of an overlaid modulation information bit 512. In aspects, the transmitter device 502 may be at least one of a first UE, a first IoT device, a RIS, a first active network node, or a first passive network node/low-power network node, and the receiver device 504 may be at least one of a second UE, a second active network node, a RIS, or a second IoT device. An active network node may be a base station, such as a gNB or other type of base station, by way of example, in various aspects. Aspects described for network nodes/base stations may be performed thereby in aggregated form and/or by one or more components thereof in disaggregated form. Additionally, or alternatively, the aspects for transmission of overlaid modulation information bits may be performed by the transmitter device 502 as a passive network node/low-power network node, or may be perform by the transmitter device 502 via a passive network node/low-power network node prior to reception by the receiver device 504.

The transmitter device 502 may be configured to transmit, for the receiver device 504 and prior to the overlaid modulation information bit 512, an overlaid modulation indication 506 indicative of a future transmission of the overlaid modulation information bit 512. In aspects, the transmitter device 502 may provide the overlaid modulation indication 506 that is indicative of a future transmission of an overlaid modulation information bit(s) to the receiver device 504 so that the receiver device 504 knows to look for the overlaid modulation information bit 512 in the frequency domain. In some aspects, the transmitter device 502 may be configured to transmit, for a network node and prior to the overlaid modulation information bit 512, a modulation configuration indication indicative of a modulation configuration associated with the shifted frequency-domain position for a future transmission of the overlaid modulation information bit 512.

The transmitter device 502 may be configured to shift (at 508) a first order harmonic, with respect to an associated transmission signal, to a shifted frequency-domain position. In some aspects, the shifted frequency-domain position may be based on a one-quarter period shift, of a time period of the associated transmission signal, that corresponds to a USB. In some aspects, the shifted frequency-domain position may be based on a three-quarters period shift, of a time period of the associated transmission signal, that corresponds to a LSB.

The transmitter device 502 may be configured to encode (at 510), based on the shifted frequency-domain position for the first order harmonic, an information bit 516 over time-domain modulated information to generate an overlaid modulation information bit 516. In aspects, the shifted frequency-domain position may correspond to a USB and may indicate a value of zero for the information bit 516, while in other aspects, the shifted frequency-domain position may correspond to a LSB and may indicate a value of one for the information bit 516.

The transmitter device 502 may be configured to transmit, for a receiver device 504 and in accordance with a single sideband reflection, the overlaid modulation information bit 512. In some aspects, to transmit, for the receiver device 504 and in accordance with the single sideband reflection, the overlaid modulation information bit 512, the transmitter device 502 may be configured to transmit, for the receiver device 504, a DSB indication indicative of DSB transmissions being associated with at least one of an initiation or a termination of overlaid modulation information bits (e.g., inclusive of the overlaid modulation information bit 512) in accordance with the single sideband reflection. In such aspects, the transmitter device 502 may also be configured to transmit, for the receiver device 504, a first DSB transmission indicative of the initiation, and to transmit the overlaid modulation information bit 512 subsequent to the first DSB transmission. In other such aspects, the transmitter device 502 may also be configured to transmit, for the receiver device 504, a second DSB transmission indicative of the termination, and to transmit the overlaid modulation information bit 512 prior to the second DSB transmission. In some aspects, to transmit, for the receiver device 504 and in accordance with the single sideband reflection, the overlaid modulation information bit 512, the transmitter device 502 may be configured to transmit a harmonics indication indicative of at least one higher-order harmonic associated with the associated transmission signal, and to transmit the at least one higher-order harmonic associated with the associated transmission signal at the shifted frequency-domain position. In some aspects, to transmit, for the receiver device 504 and in accordance with the single sideband reflection, the overlaid modulation information bit 512, the transmitter device 502 may be configured to transmit the overlaid modulation information bit 512 via a network node by backscattering.

As noted above, the receiver device 504 may be configured to receive, from the transmitter device 502 and prior to the overlaid modulation information bit 512, the overlaid modulation indication 506 indicative of a future transmission of the overlaid modulation information bit 512. In aspects, the transmitter device 502 may provide the overlaid modulation indication 506 that is indicative of a future transmission of an overlaid modulation information bit(s)) to the receiver device 504 so that the receiver device 504 knows to look for the overlaid modulation information bit 512 in the frequency domain.

Accordingly, the receiver device 504 may be configured to receive, from the transmitter device 502 and in accordance with the single sideband reflection, the overlaid modulation information bit 512 based on the shifted first order harmonic, of the associated transmission signal, at the shifted frequency-domain position. In aspects, the shifted frequency-domain position may be based on a one-quarter period shift, of the time period of the associated transmission signal, that corresponds to an USB. In other aspects, the shifted frequency-domain position may be based on a three-quarters period shift, of the time period of the associated transmission signal, that corresponds to a LSB. In aspects, the shifted frequency-domain position corresponds to a USB associated with the value of zero for the information bit 516, while in other aspects the shifted frequency-domain position corresponds to a LSB associated with a value of one for the information bit 516. In aspects, to receive, from the transmitter device 502 and in accordance with the single sideband reflection, the overlaid modulation information bit 512, the receiver device 504 may be configured to receive the overlaid modulation information bit 512 via a network node by backscattering. In such aspects, the receiver device 504 may be configured to receive the overlaid modulation information bit 512 via the network node by backscattering based on a modulation configuration of the network node that is associated with the shifted frequency-domain position. In some aspects, to receive, from the transmitter device 502 and in accordance with the single sideband reflection, the overlaid modulation information bit 512, the receiver device 504 may be configured to receive, from the transmitter device 502, a DSB indication indicative of DSB transmissions being associated with at least one of an initiation or a termination of overlaid modulation information bits (e.g., inclusive of the overlaid modulation information bit 512) in accordance with the single sideband reflection. In such aspects, the receiver device 504 may also be configured to receive, from the transmitter device 502, a first DSB transmission indicative of the initiation, and to receive the overlaid modulation information bit 512 subsequent to the first DSB transmission. In other such aspects, the transmitter device 502 may also be configured to receive, from the transmitter device 502, a second DSB transmission indicative of the termination, and to receive the overlaid modulation information bit 512 prior to the second DSB transmission. In some aspects, to receive, from the transmitter device 502 and in accordance with the single sideband reflection, the overlaid modulation information bit 512, the receiver device 504 may be configured to receive a harmonics indication indicative of at least one higher-order harmonic associated with the associated transmission signal, and to receive the at least one higher-order harmonic associated with the associated transmission signal at the shifted frequency-domain position.

The receiver device 504 may be configured to decode (at 514), based on the shifted frequency-domain position for the shifted first order harmonic, the overlaid modulation information bit 512 in association with time-domain modulated information to generate the information bit 516 (e.g., that was encoded (at 510) by the transmitter device 502).

In various aspects, the transmitter device 502 may comprise at least one transceiver coupled to at least one processor of the transmitter device 502, and to transmit, for the receiver device 504 and in accordance with the single sideband reflection, the overlaid modulation information bit 512, the transmitter device 502 may be configured to transmit, for the receiver device 504 and in accordance with the single sideband reflection, the overlaid modulation information bit 512 via the at least one transceiver. In various aspects, the receiver device 504 may comprise at least one transceiver coupled to at least one processor of the receiver device 504, and to receive, from the transmitter device 502 and in accordance with the single sideband reflection, the overlaid modulation information bit 512 based on the shifted first order harmonic, of the associated transmission signal, at the shifted frequency-domain position, the receiver device 504 may be configured to receive, from the transmitter device 502 and in accordance with the single sideband reflection, the overlaid modulation information bit 512 via the at least one transceiver.

Figure 6:
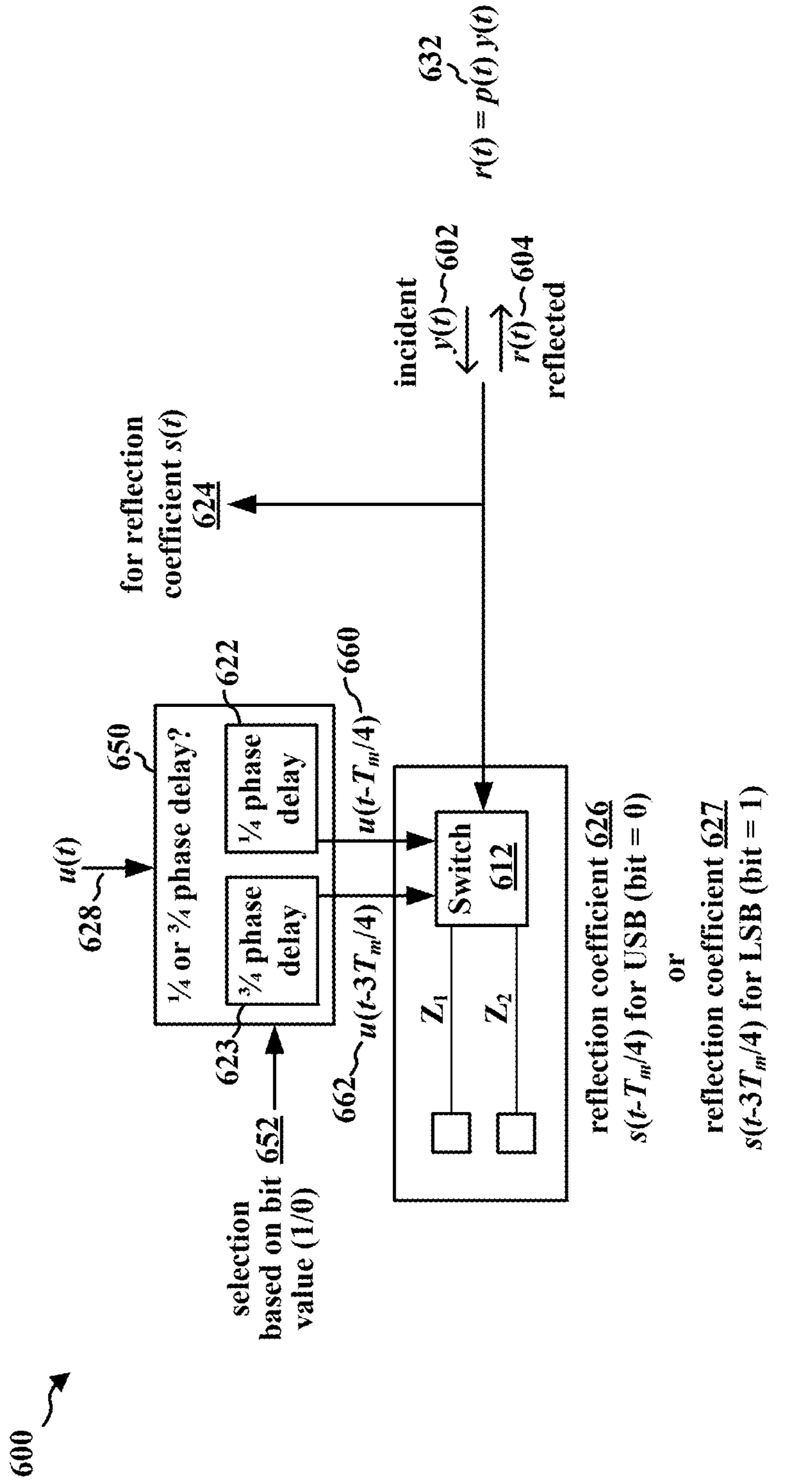
FIG. 6 is a diagram illustrating examples of first harmonic time shifts for overlaid frequency-domain reflection modulation, in accordance with various aspects of the present disclosure.

FIG. 6 is a diagram 600 illustrating examples of first harmonic time shifts for overlaid frequency-domain reflection modulation, in various aspects. Diagram 600 may be in furtherance of diagram 400 in FIG. 4 for overlaid frequency-domain reflection modulation aspects, as described herein, and references may be made for diagram 600 to terms described in FIG. 4. For instance, diagram 600 shows an example RM configuration in the context of an incident waveform 602 (y(t)) and a reflected waveform 604 (r(t)). Diagram 600 illustrates shifted copies of clocks via different phase delays that are used to select between sidebands, e.g., for an USB or a LSB, for different bit values of single sideband transmissions.

While diagram 400 described above shows a one-quarter phase shift of the modulated waveform 428 (u(t)) generated by the modulation 420 used to eliminate one of the sidebands, e.g., one single sideband transmission, diagram 600, according to aspects herein, enables utilization of the USB for a bit value of 0 and the LSB for a bit value of 1 via a ¼ phase shift and a ¾ phase shift, respectively, of a modulated waveform 628 (u(t)).

The incident waveform 602 and the reflected waveform 604 may be received/reflected via an Rx/Tx component (e.g., an RIS, an A-IoT tag, an antenna, etc.) and may be similarly split and/or subjected to a TL as described in FIG. 4 (not shown for illustrative clarity and brevity of description), e.g., a split may be provided for a reflection coefficient 624 (s(t) (e.g., a base reflection coefficient). In contrast to FIG. 4, however, a representation of the incident waveform 602 may, e.g., after splitting, be provided to a switch 612 for a ¼ phase shift (e.g., for a shift of the modulated waveform 628 to $u(t-T_m/4)$ 660 via a ¼ phase delay 622) and/or for a ¾ phase shift (e.g., for a shift of the modulated waveform 628 to $u(t-3T_m/4)$ 662 via a ¾ phase delay 623). The switch 612 may be associated with a reflection coefficient 626 ($s(t-T_m/4)$) and a USB, and may also be associated with a reflection coefficient 627 ($s(t-3T_m/4)$) and a LSB, where $T_m$ is a modulation time based on the phase difference introduced for the incident waveform 602. A determination of which the switch 612 receives for shifting the incident waveform 602 may be made by a selector 650 (e.g., a switch or other selection component/mechanism, such as iterating over a ¼ phase delay one time or three times) based on a selection indication 652 for which bit value is associated with data to be transmitted via overlaid frequency-domain reflection modulation. Accordingly, without adding additional complexity, e.g., implementing a proper selection of a time shift, the first harmonic (and the other higher order harmonics) of the incident waveform 602 may be moved to a desired location corresponding to different bit values for overlaid frequency-domain reflection modulation.

That is, time shifts of one-quarter (e.g., $T_m/4$) and three-quarters (e.g., $3T_m/4$) of a full period of a load switching pattern lead to a spectrum with the first harmonic at the USB or the LSB, respectively, and higher order harmonics follow in an alternating fashion. As an example, considering the case for a ¼ phase shift (e.g., for a shift of the modulated waveform 628 to $u(t-T_m/4)$ 660, an overall waveform 632 (p(t)), utilized to modulate the incident waveform 602 and to accomplish single sideband transmissions of different bit values (e.g., via USB/LSB) for the reflected waveform 604, e.g., where r(t)=p(t)y(t), may be represented as:

$$\begin{aligned}p(t) &= s(t) + e^{\frac{j\pi}{2}} s\left(t - \frac{T_m}{4}\right)\\ &= \sum_{\substack{\ell=1\\ \ell:\,odd}} a_\ell\left[\sin\left(\frac{2\pi\ell t}{T_m}\right) + j\sin\left(\frac{2\pi\ell(t - T_m/4)}{T_m}\right)\right]\\ &= \sum_{\substack{\ell=1\\ \ell:\,odd}} a_\ell\left[\sin\left(\frac{2\pi\ell t}{T_m}\right) + jb_\ell\cos\left(\frac{2\pi\ell t}{T_m}\right)\right]\\ &= \sum_{\substack{\ell=1\\ \ell:\,odd}} ja_\ell b_\ell e^{-j\frac{2\pi\ell b_\ell t}{T_m}}\end{aligned}$$

where $$b_\ell = \begin{bmatrix} -1, \ell = 1, 5, 9 \ldots \text{ (for } USB\text{)} \\ +1, \ell = 3, 7, 11 \ldots \text{ (for } LSB\text{).}\end{bmatrix}$$

In the context of the spectrum of the reflected waveform 604, and from the relation r(t)=p(t)y(t), it may be shown in the frequency domain that:

$$\begin{aligned}R(f) &= \sum_{\substack{\ell=1\\ \ell:\,odd}} ja_\ell b_\ell Y\left(f + b_\ell\frac{\ell}{T_m}\right)\\ &= -\sum_{\ell=1,5,\ldots}^{\infty} ja_\ell Y\left(f - \frac{\ell}{T_m}\right) + \sum_{\ell=3,7,\ldots}^{\infty} ja_\ell Y\left(f + \frac{\ell}{T_m}\right)\end{aligned}$$

where $$Y\left(f - \frac{\ell}{T_m}\right)$$

is the USB (for the first harmonic order), and where $$Y\left(f + \frac{\ell}{T_m}\right)$$

the LSB. Thus, sending a bit with a value of 0 (zero) in the frequency domain may be accomplished via the USB in the case of a ¼ phase shift.

As another example, considering the case for a ¾ phase shift (e.g., for a shift of the modulated waveform 628 to $u(t-3T_m/4)$ 662, the overall waveform 632 (p(t)), utilized to modulate the incident waveform 602 and to accomplish single sideband transmissions of different bit values (e.g., via USB/LSB) for the reflected waveform 604, e.g., where r(t)=p(t)y(t), may be represented as:

$$\begin{aligned}p(t) &= s(t) + e^{\frac{j\pi}{2}} s\left(t - \frac{3T_m}{4}\right)\\ &= \sum_{\substack{\ell=1\\ \ell:\,odd}} a_\ell\left[\sin\left(\frac{2\pi\ell t}{T_m}\right) + j\sin\left(\frac{2\pi\ell(t - 3T_m/4)}{T_m}\right)\right]\\ &= \sum_{\substack{\ell=1\\ \ell:\,odd}} a_\ell\left[\sin\left(\frac{2\pi\ell t}{T_m}\right) - jb_\ell\cos\left(\frac{2\pi\ell t}{T_m}\right)\right]\\ &= \sum_{\substack{\ell=1\\ \ell:\,odd}} ja_\ell b_\ell e^{+\frac{2\pi\ell b_\ell t}{T_m}}\end{aligned}$$

where $$b_\ell = \begin{bmatrix} -1, \ell = 1, 5, 9 \ldots \text{ (for } LSB\text{)} \\ +1, \ell = 3, 7, 11 \ldots \text{ (for } USB\text{).}\end{bmatrix}$$

In the context of the spectrum of the reflected waveform 604, and from the relation r(t)=p(t)y(t), it may be shown in the frequency domain that:

$$\begin{aligned}R(f) &= \sum_{\substack{\ell=1\\ \ell:\,odd}} ja_\ell b_\ell Y\left(f - b_\ell\frac{\ell}{T_m}\right)\\ &= -\sum_{\ell=1,5,\ldots}^{\infty} ja_\ell Y\left(f + \frac{\ell}{T_m}\right) + \sum_{\ell=3,7,\ldots}^{\infty} ja_\ell Y\left(f - \frac{\ell}{T_m}\right)\end{aligned}$$

where $$Y\left(f+\frac{\ell}{T_m}\right)$$

is the LSB (for the first harmonic order), and where $$Y\left(f-\frac{\ell}{T_m}\right)$$

is the USB. Thus, sending a bit with a value of 1 (one) in the frequency domain may be accomplished via the LSB in the case of a ¾ phase shift.

Figure 7:
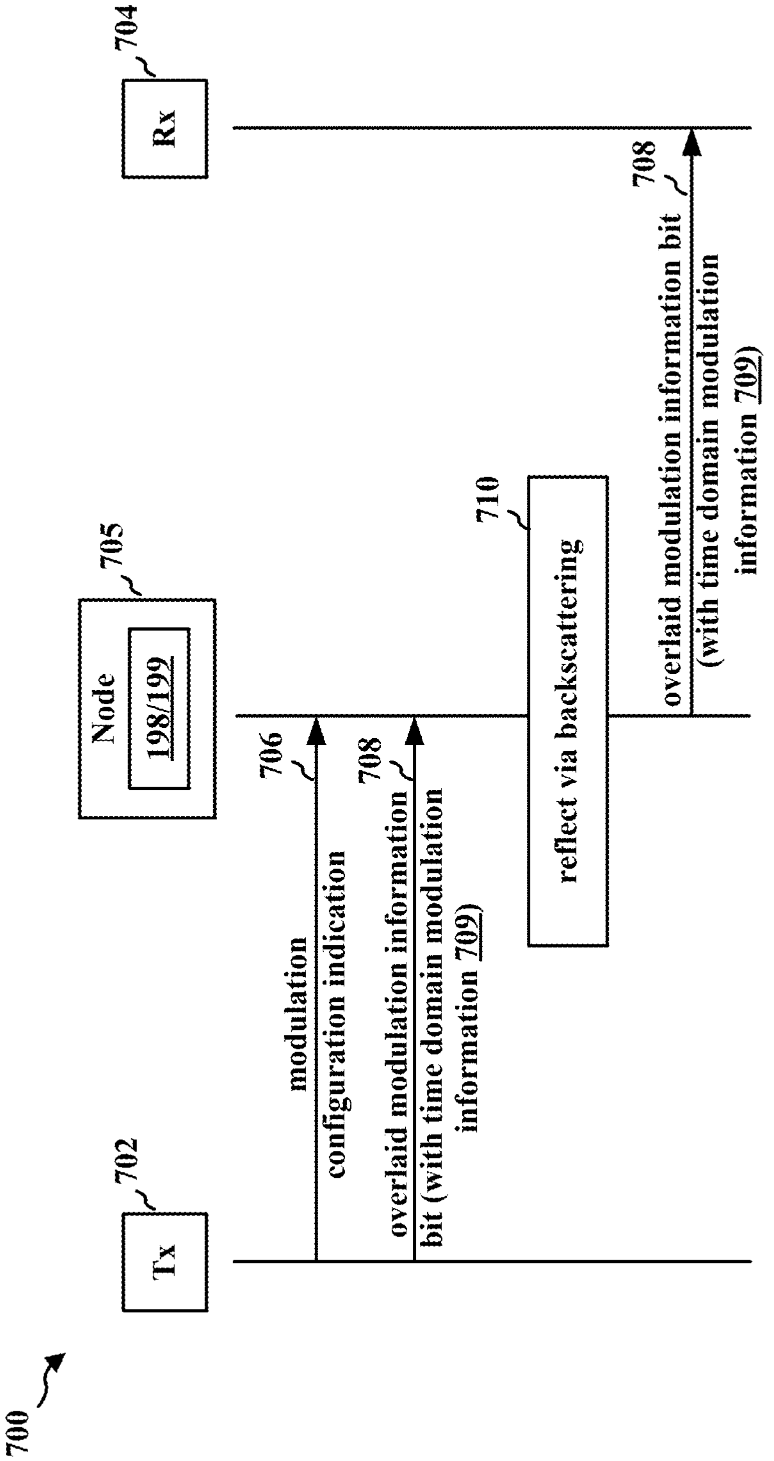
FIG. 7 is a diagram illustrating an example of passive network node assisted transmissions for overlaid frequency-domain reflection modulation, in accordance with various aspects of the present disclosure.

FIG. 7 is a diagram 700 illustrating an example of passive network node assisted transmissions for overlaid frequency-domain reflection modulation, in various aspects. Diagram 700 illustrates overlaid frequency-domain reflection modulation for a transmitter device 702 (Tx) that communicates with a receiver device 704 (Rx), e.g., for transmission/reception of an overlaid modulation information bit 708 via a passive network node 705. In aspects, the passive network node 705/low-power network node may an RIS, an IoT device, etc., and may include the component 198 and/or the component 199, as described herein. Diagram 700 may be an aspect of diagram 500 in FIG. 5.

The transmitter device 702 may be configured to transmit, and the passive network node 705 may be configured to receive (e.g., prior to an overlaid modulation information bit 708), a modulation configuration indication 706 that may be indicative of a modulation configuration associated with a shifted frequency-domain position for a future transmission of the overlaid modulation information bit 708. In aspects, the transmitter device 702 may provide an indication (e.g., the overlaid modulation indication 506 described for FIG. 5) indicative of a future transmission of an overlaid modulation information bit(s)) to the receiver device 704 so that the receiver device 704 knows to look for the overlaid modulation information bit 708 in the frequency domain, and the transmitter device 702 may be configured to transmit another indication (e.g., the modulation configuration indication 706) to the passive network node 705 (e.g., as a reflecting network node) to begin overlaid frequency-domain reflection modulation via single sideband reflection. The transmitter device 702 may be configured to transmit the overlaid modulation information bit 708 with time domain modulation information 709 to be received by the passive network node 705. The passive network node 705 may be configured to properly reflect via backscattering (at 710) the overlaid modulation information bit 708 based on the modulation configuration indication 706, and thus the receiver device 704 may be configured to receive the overlaid modulation information bit 708 with time domain modulation information 709 via backscattering by the passive network node 705.

In an example, the transmitter device 702 and/or the passive network node 705 (e.g., as a reflecting node) may treat frequency-domain bits (e.g., the overlaid modulation information bit 708) as optional so that the receiver device 704 may skip demodulation in the frequency domain while still performing time-domain demodulation. The modulation can therefore be configured in both the time domain and the frequency domain without the one interfering with/harming the other.

The transmitter device 702 may also move the passive network node 705/the reflecting node to the time/frequency modulation scheme for overlaid frequency-domain reflection modulation via single sideband reflection to benefit from the higher power associated with the desired harmonic (e.g., to improve the detection performance at the receiver device 704). As an example, the single harmonic in a single sideband transmission may be greater than the respective harmonic in a DSB transmission. For instance, the single sideband transmission may be represented as:

$$p(t)=\sum_{\substack{\ell=1\\ \ell:odd}} ja_\ell b_\ell e^{\pm j\frac{2\pi\ell b_\ell t}{T_m}}$$

while the DSB transmission may be represented as $$s(t)=\sum_{\substack{\ell=1\\ \ell:odd}}^{\infty}\frac{a_\ell}{2}\left(e^{-j\frac{2\pi\ell t}{T_m}}-e^{j\frac{2\pi\ell bt}{T_m}}\right)$$

and thus, the single sideband transmission may be 6 dB greater than the DSB transmission in consideration of the term a versus the term $$\frac{a_\ell}{2}$$

and the ±exponential term.

Figure 8:
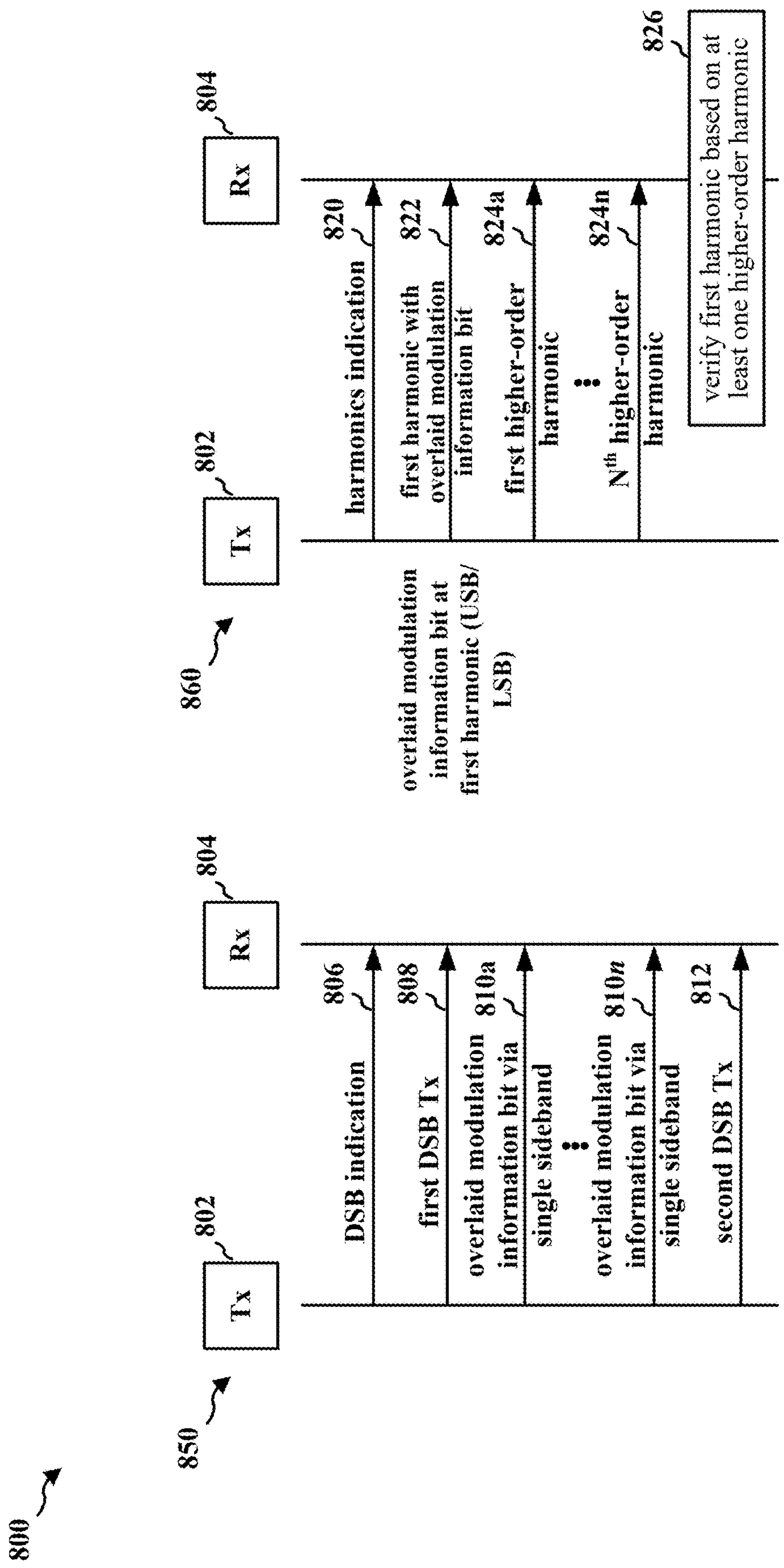
FIG. 8 is a diagram illustrating examples of double sideband (DSB) transmissions and higher-order harmonic transmissions for overlaid frequency-domain reflection modulation, in accordance with various aspects of the present disclosure.

FIG. 8 is a diagram 800 illustrating examples of DSB transmissions and higher-order harmonic transmissions for overlaid frequency-domain reflection modulation, in various aspects. Diagram 800 shows a transmitter device 802 that communicates with a receiver device 804 for DSB transmissions and higher-order harmonic transmissions in accordance with overlaid frequency-domain reflection modulation.

For various cases, the transmitter device 802 may benefit from using DSB and single sideband transmissions interchangeably. As one example, the use of a "balanced" spectrum that DSB tones produce may be used for synchronizing purposes, e.g., the occurrence of two equal energy first harmonics may be evaluated differently by the receiver device 804 compared to single tones of the USB or the LSB (e.g., as produced by single sideband transmission/reflection).

In a configuration 850, the transmitter device 802 may be configured to transmit, and the receiver device may be configured to receive, a DSB indication 806 that is indicative of DSB transmissions being associated with at least one of an initiation or a termination of overlaid modulation information bits in accordance with single sideband reflection. As one example, a first DSB transmission 808 (first DSB Tx) that may be indicative of an initiation of overlaid modulation information bits to be transmitted. Subsequently, the transmitter device 802 may be configured to transmit, and the receiver device 804 may be configured to receive, an overlaid modulation information bit 810*a*. In some aspects, there may be a single overlaid modulation information bit (e.g., the overlaid modulation information bit 810*a*), while in other aspects, the transmitter device 802 may be configured to transmit, and the receiver device 804 may be configured to receive, multiple (e.g., N) overlaid modulation information bits, e.g. up to an overlaid modulation information bit 810*n*. After the final overlaid modulation information bit is transmitted, the transmitter device 802 may be configured to transmit, and the receiver device 804 may be configured to receive, a second DSB transmission 812 (second DSB Tx) that may be indicative of a termination of overlaid modulation information bits being transmitted.

In some aspects, the receiver device 804 may also use the location of additional higher order harmonics to improve its detection performance, e.g., if the receiver device 804 has an indication that it found a first harmonic, then the receiver device 804 may verify such an indication by looking at respective higher-order harmonics, which should follow a well-structured pattern. To this end, the transmitter device 802 may provide an indication to the receiver device 804 to allow the higher-order harmonics for analysis, as there may not be a significant higher-order harmonic perceived because of harmonic cancellation techniques in use. In an example, the transmitter device 802 may indicate to the receiver device 804 which higher-order harmonics to look for, and the transmitter device 802 may intentionally not fully eliminate those harmonics so that the receiver device 804 may detect and utilize them.

In a configuration 860, the transmitter device 802 may be configured to transmit, and the receiver device 804 may be configured to receive, a harmonics indication 820 that is indicative of at least one higher-order harmonic associated with an associated transmission signal. The transmitter device 802 may be configured to transmit, and the receiver device 804 may be configured to receive, the at least one higher-order harmonic associated with the associated transmission signal at a shifted frequency-domain position (e.g., the shifted frequency-domain position of the first harmonic for single sideband reflection/transmission. For instance, the transmitter device 802 may be configured to transmit, and the receiver device 804 may be configured to receive, one or more of a first higher-order harmonic 824*a* to an $N^{th}$ higher-order harmonic 824*n*. Subsequently, the receiver device 804 may be configured to verify (at 826) the first harmonic with the overlaid information bit 822 based on at least one higher-order harmonic (e.g., one or more of the first higher-order harmonic 824*a* to the $N^{th}$ higher-order harmonic 824*n*).

Figure 9:
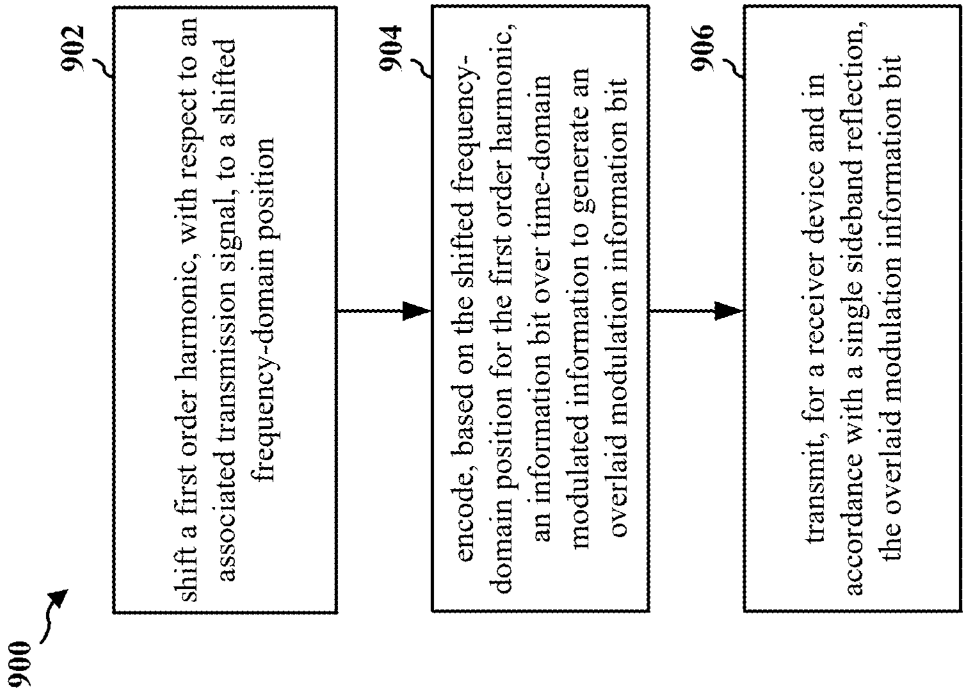
FIG. 9 is a flowchart of a method of wireless communication.

FIG. 9 is a flowchart 900 of a method of wireless communication. The method may be performed by a transmitter device (e.g., 502, 702, 802) (e.g., the base station 102; the UE 104; the apparatus 1304; the network entity 1302, 1402; an IoT device; a passive network node). In some aspects, the method may include aspects described in connection with the communication flow in FIG. 5 and/or aspects described in FIGS. 6, 7, 8. The method may be for overlaid frequency-domain reflection modulation, and may provide for overlaying information bits in existing time domain modulations by utilizing the location of a first order harmonic for waveforms (e.g., left-shifted/LSB or right-shifted/USB) of the original spectrum, provide for eliminating image tones of first order harmonics and reducing power consumption utilizing frequency-shifts through harmonic frequencies, and provide for retrieving modulated bits in the frequency domain by a receiver device, while still performing demodulation in the time domain to retrieve other bits for its underlying RM scheme in the time domain, by encoding additional bits on top of existing time-domain modulation scheme in an overlaid fashion by a transmitter device.

At 902, the transmitter device shifts a first order harmonic, with respect to an associated transmission signal, to a shifted frequency-domain position. As an example, the shift may be performed by one or more of the component 198, the transceiver 1322, and/or the antenna 1380 in FIG. 13, and/or the transceiver 1446, and/or the antenna 1480 in FIG. 14. FIG. 5 illustrates an example of the transmitter device (e.g., the transmitter device 502) shifting such a first order harmonic.

The transmitter device 502 may be configured to shift (at 508) (e.g., 650: 622, 623 in FIG. 6) a first order harmonic (e.g., 660, 662 in FIG. 6), with respect to an associated transmission signal (e.g., 602 in FIG. 6), to a shifted frequency-domain position (e.g., $$-\sum_{\ell=1,5,\ldots}^{\infty} ja_\ell Y\left(f \pm \frac{\ell}{T_m}\right) \text{ for } l=1,$$

for FIG. 6). In some aspects, the shifted frequency-domain position (e.g.

$$-\sum_{\ell=1,5,\ldots}^{\infty} ja_\ell Y\left(f \pm \frac{\ell}{T_m}\right)$$

for l=1, for FIG. 6) may be based on a one-quarter period shift (e.g., 650: 622 in FIG. 6), of a time period of the associated transmission signal (e.g., 602 in FIG. 6), that corresponds to a USB (e.g., $$-\sum_{\ell=1,5,\ldots}^{\infty} ja_\ell Y\left(f \pm \frac{\ell}{T_m}\right)$$

for l=1, for FIG. 6). In some aspects, the shifted frequency-domain position (e.g., $$-\sum_{\ell=1,5,\ldots}^{\infty} ja_\ell Y\left(f - \frac{\ell}{T_m}\right)$$

for l=1, for FIG. 6) may be based on a three-quarters period shift (e.g., 650: 623 in FIG. 6), of a time period of the associated transmission signal (e.g., 602 in FIG. 6), that corresponds to a LSB (e.g., $$Y\left(f + \frac{\ell}{T_m}\right)$$

for l=1, for FIG. 6).

At 904, the transmitter encodes, based on the shifted frequency-domain position for the first order harmonic, an information bit over time-domain modulated information to generate an overlaid modulation information bit. As an example, the encode may be performed by one or more of the component 198, the transceiver 1322, and/or the antenna 1380 in FIG. 13, and/or the transceiver 1446, and/or the antenna 1480 in FIG. 14. FIG. 5 illustrates an example of the transmitter device (e.g., the transmitter device 502) encoding such an information bit over time-domain modulated information to generate an overlaid modulation information bit.

The transmitter device 502 may be configured to encode (at 510), based on the shifted frequency-domain position (e.g.

$$-\sum_{\ell=1,5,\ldots}^{\infty} ja_\ell Y\left(f \pm \frac{\ell}{T_m}\right)$$

for l=1, for FIG. 6) for the first order harmonic (e.g., 660, 662 in FIG. 6), an information bit 516 over time-domain modulated information to generate an overlaid modulation information bit. In aspects, the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) may correspond to a USB and may indicate a value of zero for the information bit 516, while in other aspects, the shifted frequency-domain position $$\left(\text{e.g.}, -\sum_{\ell=1,5,\ldots}^{\infty} ja_\ell Y\left(f \pm \frac{\ell}{T_m}\right)\right.$$

for l=1, for FIG. 6) may correspond to a LSB and may indicate a value of one for the information bit 516.

At 906, the transmitter transmits, for a receiver device and in accordance with a single sideband reflection, the overlaid modulation information bit. As an example, the transmission may be performed by one or more of the component 198, the transceiver 1322, and/or the antenna 1380 in FIG. 13, and/or the transceiver 1446, and/or the antenna 1480 in FIG. 14. FIG. 5 illustrates an example of the transmitter device (e.g., the transmitter device 502) transmitting such an overlaid modulation information bit for a receiver device (e.g., the receiver device 504).

The transmitter device 502 may be configured to transmit, for a receiver device 504 and in accordance with a single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8). In some aspects, to transmit, for the receiver device 504 and in accordance with the single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8), the transmitter device 502 may be configured to transmit, for the receiver device 504, a DSB indication (e.g., 806 in FIG. 8) indicative of DSB transmissions (e.g., 808, 812 in FIG. 8) being associated with at least one of an initiation or a termination of overlaid modulation information bits (e.g., USB (bit=0), LSB (bit=1), in FIG. 6; 708 in FIG. 7; 810*a* to 810*n*, 822 in FIG. 8) (e.g., inclusive of the overlaid modulation information bit 512) in accordance with the single sideband reflection (e.g., at 710 in FIG. 7). In such aspects, the transmitter device 502 may also be configured to transmit, for the receiver device 504, a first DSB transmission (e.g., 808 in FIG. 8) indicative of the initiation, and to transmit the overlaid modulation information bit 512 (e.g., USB (bit=0), LSB (bit=1), in FIG. 6; 708 in FIG. 7; 810*a* to 810*n*, 822 in FIG. 8) subsequent to the first DSB transmission (e.g., 808 in FIG. 8). In other such aspects, the transmitter device 502 may also be configured to transmit, for the receiver device 504, a second DSB transmission (e.g., 812 in FIG. 8) indicative of the termination, and to transmit the overlaid modulation information bit 512 (e.g., USB (bit=0), LSB (bit=1), in FIG. 6; 708 in FIG. 7; 810*a* to 810*n*, 822 in FIG. 8) prior to the second DSB transmission (e.g., 812 in FIG. 8). In some aspects, to transmit, for the receiver device 504 and in accordance with the single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8), the transmitter device 502 may be configured to transmit a harmonics indication (e.g., 820 in FIG. 8) indicative of at least one higher-order harmonic (e.g., 822*a* to 822*n* in FIG. 8) associated with the associated transmission signal (e.g., 602 in FIG. 6), and to transmit the at least one higher-order harmonic associated with the associated transmission signal (e.g., 602 in FIG. 6) at the shifted frequency-domain position (e.g.

$$-\sum_{\ell=1,5,\ldots}^{\infty} ja_\ell Y\left(f \pm \frac{\ell}{T_m}\right)$$

for l=1, for FIG. 6). In some aspects, to transmit, for the receiver device 504 and in accordance with the single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8), the transmitter device 502 may be configured to transmit the overlaid modulation information bit 512 (e.g., USB (bit=0), LSB (bit=1), in FIG. 6; 708 in FIG. 7; 810*a* to 810*n*, 822 in FIG. 8) via a network node (e.g., 705 in FIG. 7) by backscattering.

Figure 10:
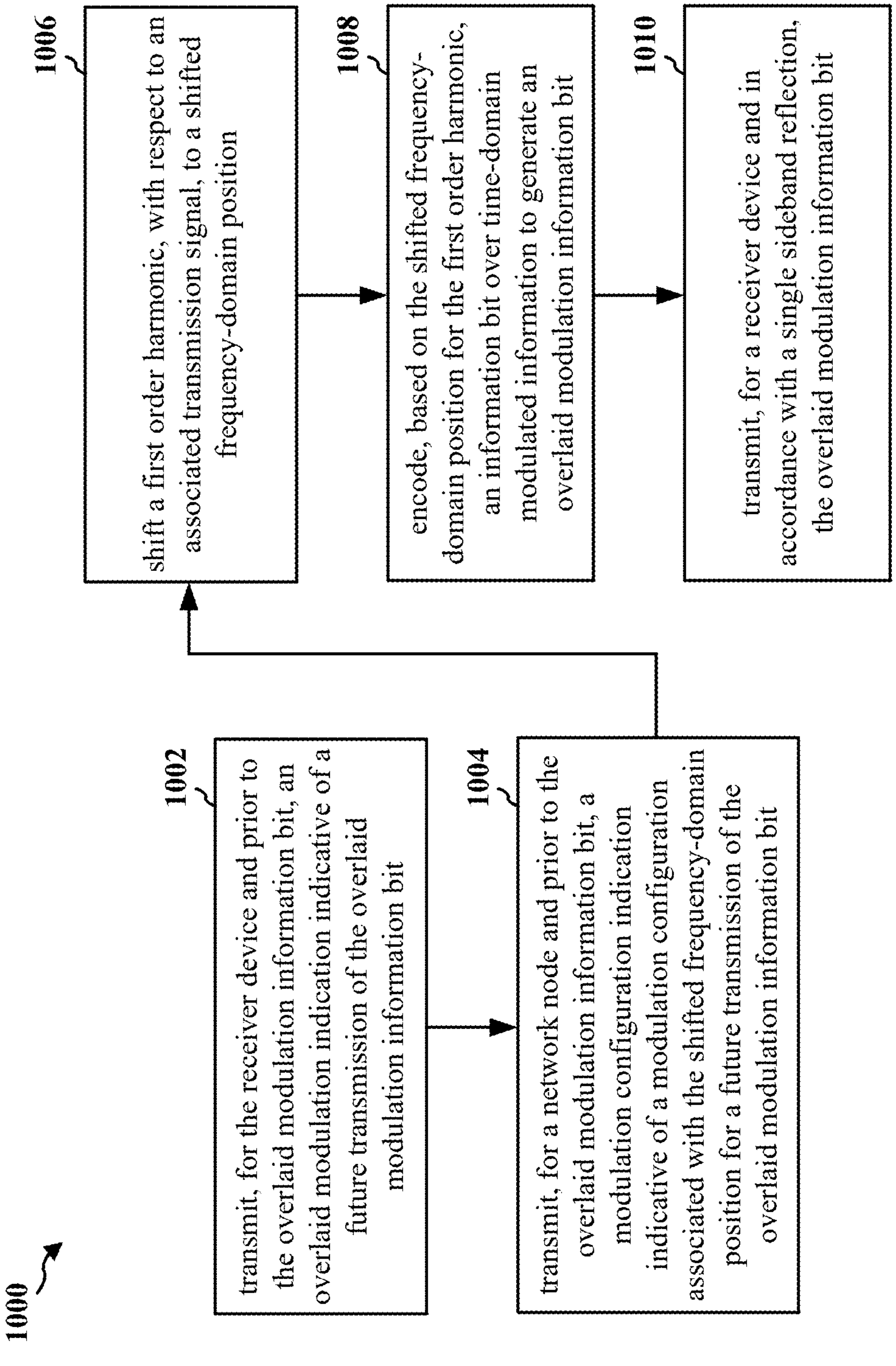
FIG. 10 is a flowchart of a method of wireless communication.

FIG. 10 is a flowchart 1000 of a method of wireless communication. The method may be performed by a transmitter device (e.g., 502, 702, 802) (e.g., the base station 102; the UE 104; the apparatus 1304; the network entity 1302, 1402; an IoT device; a passive network node). In some aspects, the method may include aspects described in connection with the communication flow in FIG. 5 and/or aspects described in FIGS. 6, 7, 8. The method may be for overlaid frequency-domain reflection modulation, and may provide for overlaying information bits in existing time domain modulations by utilizing the location of a first order harmonic for waveforms (e.g., left-shifted/LSB or right-shifted/USB) of the original spectrum, provide for eliminating image tones of first order harmonics and reducing power consumption utilizing frequency-shifts through harmonic frequencies, and provide for retrieving modulated bits in the frequency domain by a receiver device, while still performing demodulation in the time domain to retrieve other bits for its underlying RM scheme in the time domain, by encoding additional bits on top of existing time-domain modulation scheme in an overlaid fashion by a transmitter device.

At 1002, the transmitter device transmits, for the receiver device and prior to the overlaid modulation information bit, an overlaid modulation indication indicative of a future transmission of the overlaid modulation information bit. As an example, the transmission may be performed by one or more of the component 198, the transceiver 1322, and/or the antenna 1380 in FIG. 13, and/or the transceiver 1446, and/or the antenna 1480 in FIG. 14. FIG. 5 illustrates an example of the transmitter device (e.g., the transmitter device 502) transmitting such an overlaid modulation indication for a receiver device (e.g., the receiver device 504).

The transmitter device 502 may be configured to transmit, for the receiver device 504 and prior to the overlaid modulation information bit 512 (e.g., USB (bit=0), LSB (bit=1), in FIG. 6; 708 in FIG. 7; 810*a* to 810*n*, 822 in FIG. 8), an overlaid modulation indication 506 (e.g., 706 in FIG. 7) indicative of a future transmission of the overlaid modulation information bit 512 (e.g., USB (bit=0), LSB (bit=1), in FIG. 6; 708 in FIG. 7; 810*a* to 810*n*, 822 in FIG. 8). In aspects, the transmitter device 502 may provide the overlaid modulation indication 506 (e.g., 706 in FIG. 7) that is indicative of a future transmission of an overlaid modulation information bit(s) (e.g., 708 in FIG. 7) to the receiver device 504 so that the receiver device 504 knows to look for the overlaid modulation information bit 512 (e.g., USB (bit=0), LSB (bit=1), in FIG. 6; 708 in FIG. 7; 810*a* to 810*n*, 822 in FIG. 8) in the frequency domain.

At 1004, the transmitter device transmits, for a network node and prior to the overlaid modulation information bit, a modulation configuration indication indicative of a modulation configuration associated with the shifted frequency-domain position for a future transmission of the overlaid modulation information bit. As an example, the transmission may be performed by one or more of the component 198, the transceiver 1322, and/or the antenna 1380 in FIG. 13, and/or the transceiver 1446, and/or the antenna 1480 in FIG. 14. FIGS. 5 and 7 illustrate an example of the transmitter device (e.g., the transmitter device 502/the transmitter device 702) transmitting such a modulation configuration indication for a network node (e.g., the passive network node 705).

With reference to FIG. 5, in some aspects, the transmitter device 502 may be configured to transmit, for a network node and prior to the overlaid modulation information bit 512 (e.g., USB (bit=0), LSB (bit=1), in FIG. 6; 708 in FIG. 7; 810*a* to 810*n*, 822 in FIG. 8), a modulation configuration indication (e.g., 706 in FIG. 7) indicative of a modulation configuration associated with the shifted frequency-domain position (e.g., $$-\sum_{\ell=1,5,\ldots}^{\infty} j a_\ell Y\left(f \pm \frac{\ell}{T_m}\right)$$

for l=1, for FIG. 6) for a future transmission of the overlaid modulation information bit 512 (e.g., USB (bit=0), LSB (bit=1), in FIG. 6; 708 in FIG. 7; 810*a* to 810*n*, 822 in FIG. 8). With reference to FIG. 7, The transmitter device 702 may be configured to transmit, and the passive network node 705 may be configured to receive (e.g., prior to an overlaid modulation information bit 708 (e.g., 512 in in FIG. 5)), a modulation configuration indication 706 that may be indicative of a modulation configuration associated with a shifted frequency-domain position (e.g., $$-\sum_{\ell=1,5,\ldots}^{\infty} j a_\ell Y\left(f \pm \frac{\ell}{T_m}\right)$$

for l=1, for FIG. 6) for a future transmission of the overlaid modulation information bit 708 (e.g., 512 in in FIG. 5). In aspects, the transmitter device 702 may provide an indication (e.g., the overlaid modulation indication 506 described for FIG. 5) indicative of a future transmission of an overlaid modulation information bit(s) (e.g., 512 in FIG. 5) to the receiver device 704 so that the receiver device 704 knows to look for the overlaid modulation information bit 708 (e.g., 512 in in FIG. 5) in the frequency domain, and the transmitter device 702 may be configured to transmit another indication (e.g., the modulation configuration indication 706) to the passive network node 705 (e.g., as a reflecting network node) to begin overlaid frequency-domain reflection modulation via single sideband reflection. The transmitter device 702 may be configured to transmit the overlaid modulation information bit 708 (e.g., 512 in in FIG. 5) with time domain modulation information 709 to be received by the passive network node 705. The passive network node 705 may be configured to properly reflect via backscattering (at 710) the overlaid modulation information bit 708 (e.g., 512 in in FIG. 5) based on the modulation configuration indication 706, and thus the receiver device 704 may be configured to receive the overlaid modulation information bit 708 (e.g., 512 in in FIG. 5) with time domain modulation information 709 via backscattering by the passive network node 705.

At 1006, the transmitter device shifts a first order harmonic, with respect to an associated transmission signal, to a shifted frequency-domain position. As an example, the shift may be performed by one or more of the component 198, the transceiver 1322, and/or the antenna 1380 in FIG. 13, and/or the transceiver 1446, and/or the antenna 1480 in FIG. 14. FIG. 5 illustrates an example of the transmitter device (e.g., the transmitter device 502) shifting such a first order harmonic.

The transmitter device 502 may be configured to shift (at 508) (e.g., 650: 622, 623 in FIG. 6) a first order harmonic (e.g., 660, 662 in FIG. 6), with respect to an associated transmission signal (e.g., 602 in FIG. 6), to a shifted frequency-domain position (e.g., $$-\sum_{\ell=1,5,\ldots}^{\infty} j a_\ell Y\left(f \pm \frac{\ell}{T_m}\right)$$

for l=1, for FIG. 6). In some aspects, the shifted frequency-domain position (e.g., $$-\sum_{\ell=1,5,\ldots}^{\infty} j a_\ell Y\left(f \pm \frac{\ell}{T_m}\right)$$

for l=1, for FIG. 6) may be based on a one-quarter period shift (e.g., 650: 622 in FIG. 6), of a time period of the associated transmission signal (e.g., 602 in FIG. 6), that corresponds to a USB (e.g., $$-\sum_{\ell=1,5,\ldots}^{\infty} j a_\ell Y\left(f \pm \frac{\ell}{T_m}\right)$$

for l=1, for FIG. 6). In some aspects, the shifted frequency-domain position (e.g., $$-\sum_{\ell=1,5,\ldots}^{\infty} j a_\ell Y\left(f \pm \frac{\ell}{T_m}\right)$$

for l=1, for FIG. 6) may be based on a three-quarters period shift (e.g., 650: 623 in FIG. 6), of a time period of the associated transmission signal (e.g., 602 in FIG. 6), that corresponds to a LSB (e.g., $$Y\left(f + \frac{\ell}{T_m}\right)$$

for l=1, for FIG. 6).

At 1008, the transmitter encodes, based on the shifted frequency-domain position for the first order harmonic, an information bit over time-domain modulated information to generate an overlaid modulation information bit. As an example, the encode may be performed by one or more of the component 198, the transceiver 1322, and/or the antenna 1380 in FIG. 13, and/or the transceiver 1446, and/or the antenna 1480 in FIG. 14. FIG. 5 illustrates an example of the transmitter device (e.g., the transmitter device 502) encoding such an information bit over time-domain modulated information to generate an overlaid modulation information bit.

The transmitter device 502 may be configured to encode (at 510), based on the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) for the first order harmonic (e.g., 660, 662 in FIG. 6), an information bit 516 over time-domain modulated information (e.g., 709 in FIG. 7) to generate an overlaid modulation information bit. In aspects, the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) may correspond to a USB and may indicate a value of zero for the information bit 516, while in other aspects, the shifted frequency-domain position (e.g., $$-\sum_{\ell=1,5,\ldots}^{\infty} ja_\ell Y\left(f \pm \frac{\ell}{T_m}\right)$$

l=1, for FIG. 6) may correspond to a LSB and may indicate a value of one for the information bit 516.

At 1010, the transmitter transmits, for a receiver device and in accordance with a single sideband reflection, the overlaid modulation information bit. As an example, the transmission may be performed by one or more of the component 198, the transceiver 1322, and/or the antenna 1380 in FIG. 13, and/or the transceiver 1446, and/or the antenna 1480 in FIG. 14. FIG. 5 illustrates an example of the transmitter device (e.g., the transmitter device 502) transmitting such an overlaid modulation information bit for a receiver device (e.g., the receiver device 504).

The transmitter device 502 may be configured to transmit, for a receiver device 504 and in accordance with a single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8). In some aspects, to transmit, for the receiver device 504 and in accordance with the single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8), the transmitter device 502 may be configured to transmit, for the receiver device 504, a DSB indication (e.g., 806 in FIG. 8) indicative of DSB transmissions (e.g., 808, 812 in FIG. 8) being associated with at least one of an initiation or a termination of overlaid modulation information bits (e.g., USB (bit=0), LSB (bit=1), in FIG. 6; 708 in FIG. 7; 810*a* to 810*n*, 822 in FIG. 8) (e.g., inclusive of the overlaid modulation information bit 512) in accordance with the single sideband reflection (e.g., at 710 in FIG. 7). In such aspects, the transmitter device 502 may also be configured to transmit, for the receiver device 504, a first DSB transmission (e.g., 808 in FIG. 8) indicative of the initiation, and to transmit the overlaid modulation information bit 512 (e.g., USB (bit=0), LSB (bit=1), in FIG. 6; 708 in FIG. 7; 810*a* to 810*n*, 822 in FIG. 8) subsequent to the first DSB transmission (e.g., 808 in FIG. 8). In other such aspects, the transmitter device 502 may also be configured to transmit, for the receiver device 504, a second DSB transmission (e.g., 812 in FIG. 8) indicative of the termination, and to transmit the overlaid modulation information bit 512 (e.g., USB (bit=0), LSB (bit=1), in FIG. 6; 708 in FIG. 7; 810*a* to 810*n*, 822 in FIG. 8) prior to the second DSB transmission (e.g., 812 in FIG. 8). In some aspects, to transmit, for the receiver device 504 and in accordance with the single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8), the transmitter device 502 may be configured to transmit a harmonics indication (e.g., 820 in FIG. 8) indicative of at least one higher-order harmonic (e.g., 822*a* to 822*n* in FIG. 8) associated with the associated transmission signal (e.g., 602 in FIG. 6), and to transmit the at least one higher-order harmonic associated with the associated transmission signal (e.g., 602 in FIG. 6) at the shifted frequency-domain position (e.g., $$-\sum_{\ell=1,5,\ldots}^{\infty} ja_\ell Y\left(f \pm \frac{\ell}{T_m}\right)$$

for l=1, for FIG. 6). In some aspects, to transmit, for the receiver device 504 and in accordance with the single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8), the transmitter device 502 may be configured to transmit the overlaid modulation information bit 512 (e.g., USB (bit=0), LSB (bit=1), in FIG. 6; 708 in FIG. 7; 810*a* to 810*n*, 822 in FIG. 8) via a network node (e.g., 705 in FIG. 7) by backscattering.

Figure 11:
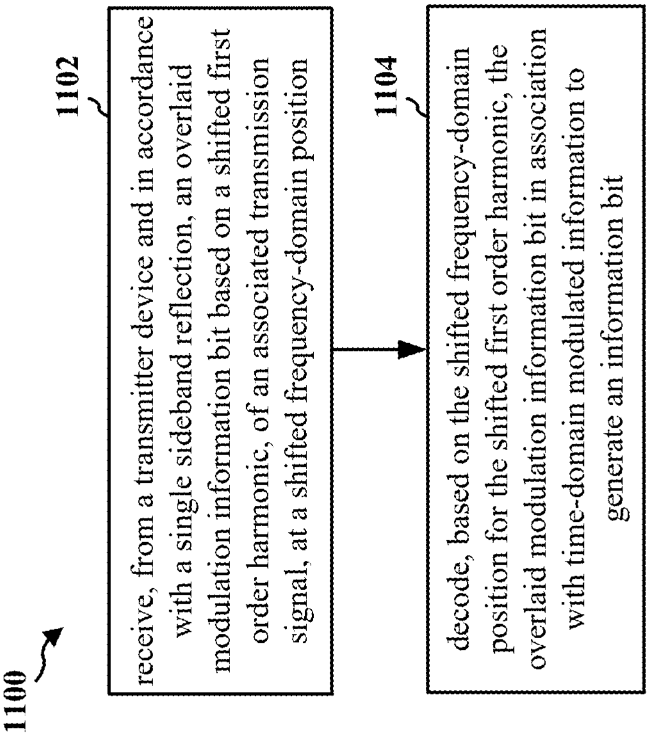
FIG. 11 is a flowchart of a method of wireless communication.

FIG. 11 is a flowchart 1100 of a method of wireless communication. The method may be performed by a receiver device (e.g., 504, 704, 804) (e.g., the base station 102; the UE 104; the apparatus 1304; the network entity 1302, 1402; an IoT device). In some aspects, the method may include aspects described in connection with the communication flow in FIG. 5 and/or aspects described in FIGS. 6, 7, 8. The method may be for overlaid frequency-domain reflection modulation, and may provide for overlaying information bits in existing time domain modulations by utilizing the location of a first order harmonic for waveforms (e.g., left-shifted/LSB or right-shifted/USB) of the original spectrum, provide for eliminating image tones of first order harmonics and reducing power consumption utilizing frequency-shifts through harmonic frequencies, and provide for retrieving modulated bits in the frequency domain by a receiver device, while still performing demodulation in the time domain to retrieve other bits for its underlying RM scheme in the time domain, by encoding additional bits on top of existing time-domain modulation scheme in an overlaid fashion by a transmitter device.

At 1102, the receiver device receives, from a transmitter device and in accordance with a single sideband reflection, an overlaid modulation information bit based on a shifted first order harmonic, of an associated transmission signal, at a shifted frequency-domain position. As an example, the reception may be performed by one or more of the component 199, the transceiver 1322, and/or the antenna 1380 in FIG. 13, and/or the transceiver 1446, and/or the antenna 1480 in FIG. 14. FIG. 5 illustrates an example of the receiver device (e.g., the receiver device 504) receiving such an overlaid modulation information bit from a transmitter device (e.g., the transmitter device 502).

The receiver device 504 may be configured to receive, from the transmitter device 502 and in accordance with the single sideband reflection, the overlaid modulation information bit 512 (e.g., USB (bit=0), LSB (bit=1), in FIG. 6; 708 in FIG. 7; 810*a* to 810*n*, 822 in FIG. 8) based on the shifted first order harmonic, of the associated transmission signal, at the shifted frequency-domain position (e.g., $$-\sum_{\ell=1,5,\ldots}^{\infty} ja_\ell Y\left(f \pm \frac{\ell}{T_m}\right)$$

for l=1, for FIG. 6). In aspects, the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) may be based on a one-quarter period shift (e.g., 650: 622 in FIG. 6), of the time period of the associated transmission signal (e.g., 602 in FIG. 6), that corresponds to an USB. In other aspects, the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) may be based on a three-quarters period shift (e.g., 650: 623 in FIG. 6), of the time period of the associated transmission signal (e.g., 602 in FIG. 6), that corresponds to a LSB. In aspects, the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) corresponds to a USB associated with the value of zero for the information bit 516, while in other aspects the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) corresponds to a LSB associated with a value of one for the information bit 516. In aspects, to receive, from the transmitter device 502 and in accordance with the single sideband reflection, the overlaid modulation information bit 512 (e.g., USB (bit=0), LSB (bit=1), in FIG. 6; 708 in FIG. 7; 810*a* to 810*n*, 822 in FIG. 8), the receiver device 504 may be configured to receive the overlaid modulation information bit 512 (e.g., USB (bit=0), LSB (bit=1), in FIG. 6; 708 in FIG. 7; 810*a* to 810*n*, 822 in FIG. 8) via a network node (e.g., 705 in FIG. 7) by backscattering. In such aspects, the receiver device 504 may be configured to receive the overlaid modulation information bit 512 (e.g., USB (bit=0), LSB (bit=1), in FIG. 6; 708 in FIG. 7; 810*a* to 810*n*, 822 in FIG. 8) via the network node (e.g., 705 in FIG. 7) by backscattering based on a modulation configuration (e.g., 706 in FIG. 7) of the network node (e.g., 705 in FIG. 7) that is associated with the shifted frequency-domain position (e.g.

$$-\sum_{\ell=1,5,\ldots}^{\infty} ja_\ell Y\left(f \pm \frac{\ell}{T_m}\right)$$

for l=1, for FIG. 6). In some aspects, to receive, from the transmitter device 502 and in accordance with the single sideband reflection, the overlaid modulation information bit 512 (e.g., USB (bit=0), LSB (bit=1), in FIG. 6; 708 in FIG. 7; 810*a* to 810*n*, 822 in FIG. 8), the receiver device 504 may be configured to receive, from the transmitter device 502, a DSB indication (e.g., 806 in FIG. 8) indicative of DSB transmissions (e.g., 808, 812 in FIG. 8) being associated with at least one of an initiation or a termination of overlaid modulation information bits (e.g., USB (bit=0), LSB (bit=1), in FIG. 6; 708 in FIG. 7; 810*a* to 810*n*, 822 in FIG. 8) (e.g., inclusive of the overlaid modulation information bit 512) in accordance with the single sideband reflection (e.g., at 710 in FIG. 7). In such aspects, the receiver device 504 may also be configured to receive, from the transmitter device 502, a first DSB transmission (e.g., 808 in FIG. 8) indicative of the initiation, and to transmit the overlaid modulation information bit 512 (e.g., USB (bit=0), LSB (bit=1), in FIG. 6; 708 in FIG. 7; 810*a* to 810*n*, 822 in FIG. 8) subsequent to the first DSB transmission (e.g., 808 in FIG. 8). In other such aspects, the transmitter device 502 may also be configured to receive, from the transmitter device 502, a second DSB transmission (e.g., 812 in FIG. 8) indicative of the termination, and to transmit the overlaid modulation information bit 512 (e.g., USB (bit=0), LSB (bit=1), in FIG. 6; 708 in FIG. 7; 810*a* to 810*n*, 822 in FIG. 8) prior to the second DSB transmission (e.g., 812 in FIG. 8). In some aspects, to receive, from the transmitter device 502 and in accordance with the single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8), the receiver device 504 may be configured to receive a harmonics indication (e.g., 820 in FIG. 8) indicative of at least one higher-order harmonic (e.g., 822*a* to 822*n* in FIG. 8) associated with the associated transmission signal (e.g., 602 in FIG. 6), and to receive the at least one higher-order harmonic associated with the associated transmission signal (e.g., 602 in FIG. 6) at the shifted frequency-domain position (e.g., $$-\sum_{\ell=1,5,\ldots}^{\infty} ja_\ell Y\left(f \pm \frac{\ell}{T_m}\right)$$

for l=1, for FIG. 6).

At 1104, the receiver device decodes, based on the shifted frequency-domain position for the shifted first order harmonic, the overlaid modulation information bit in association with time-domain modulated information to generate an information bit. As an example, the decode may be performed by one or more of the component 199, the transceiver 1322, and/or the antenna 1380 in FIG. 13, and/or the transceiver 1446, and/or the antenna 1480 in FIG. 14. FIG. 5 illustrates an example of the receiver device (e.g., the receiver device 504) decoding such an overlaid modulation information bit to generate an information bit.

The receiver device 504 may be configured to decode (at 514), based on the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) for the shifted first order harmonic (e.g., 660, 662 in FIG. 6), the overlaid modulation information bit 512 (e.g., USB (bit=0), LSB (bit=1), in FIG. 6; 708 in FIG. 7; 810*a* to 810*n*, 822 in FIG. 8) in association with time-domain modulated information (e.g., 709 in FIG. 7) to generate 516 the information bit 516 (e.g., that was encoded (at 510) by the transmitter device 502)

Figure 12:
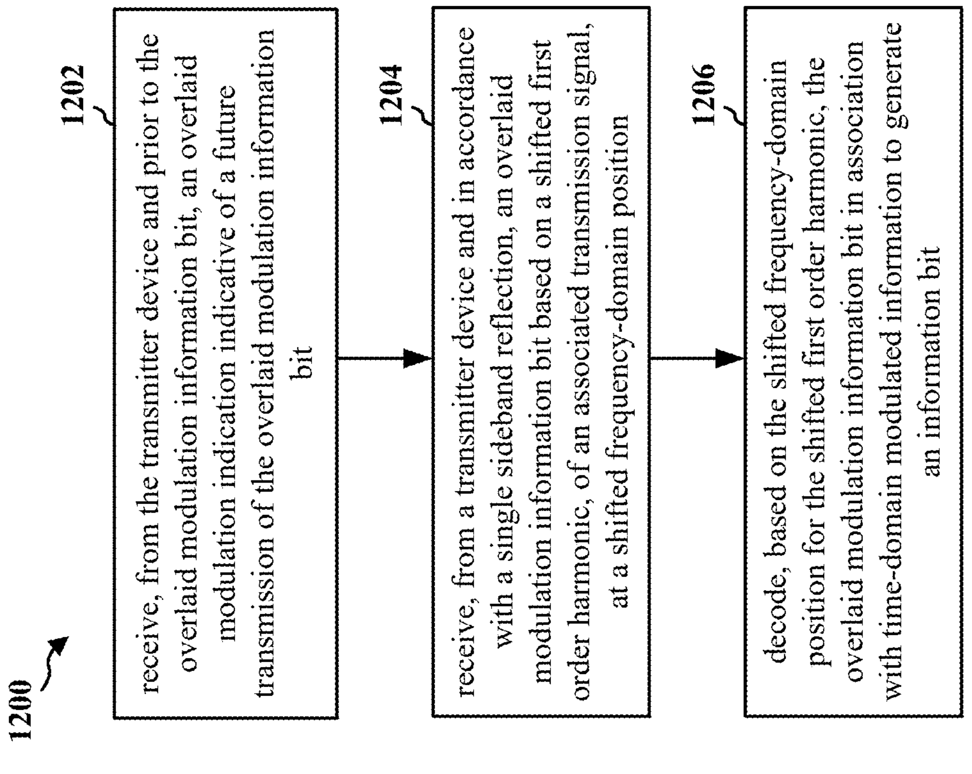
FIG. 12 is a flowchart of a method of wireless communication.

FIG. 12 is a flowchart 1200 of a method of wireless communication. The method may be performed by a receiver device (e.g., 504, 704, 804) (e.g., the base station 102; the UE 104; the apparatus 1304; the network entity 1302, 1402; an IoT device). In some aspects, the method may include aspects described in connection with the communication flow in FIG. 5 and/or aspects described in FIGS. 6, 7, 8. The method may be for overlaid frequency-domain reflection modulation, and may provide for overlaying information bits in existing time domain modulations by utilizing the location of a first order harmonic for waveforms (e.g., left-shifted/LSB or right-shifted/USB) of the original spectrum, provide for eliminating image tones of first order harmonics and reducing power consumption utilizing frequency-shifts through harmonic frequencies, and provide for retrieving modulated bits in the frequency domain by a receiver device, while still performing demodulation in the time domain to retrieve other bits for its underlying RM scheme in the time domain, by encoding additional bits on top of existing time-domain modulation scheme in an overlaid fashion by a transmitter device.

At 1202, the receiver device receives, from the transmitter device and prior to the overlaid modulation information bit, an overlaid modulation indication indicative of a future transmission of the overlaid modulation information bit. As an example, the reception may be performed by one or more of the component 199, the transceiver 1322, and/or the antenna 1380 in FIG. 13, and/or the transceiver 1446, and/or the antenna 1480 in FIG. 14. FIG. 5 illustrates an example of the receiver device (e.g., the receiver device 504) receiving such an overlaid modulation indication from a transmitter device (e.g., the transmitter device 502).

The receiver device 504 may be configured to receive, from the transmitter device 502 and prior to the overlaid modulation information bit 512 (e.g., USB (bit=0), LSB (bit=1), in FIG. 6; 708 in FIG. 7; 810*a* to 810*n*, 822 in FIG. 8), the overlaid modulation indication 506 indicative of a future transmission of the overlaid modulation information bit 512 (e.g., USB (bit=0), LSB (bit=1), in FIG. 6; 708 in FIG. 7; 810*a* to 810*n*, 822 in FIG. 8). In aspects, the transmitter device 502 may provide the overlaid modulation indication 506 that is indicative of a future transmission of an overlaid modulation information bit(s) (e.g., 512 in FIG. 5; USB (bit=0), LSB (bit=1), in FIG. 6; 708 in FIG. 7; 810*a* to 810*n*, 822 in FIG. 8)) to the receiver device 504 so that the receiver device 504 knows to look for the overlaid modulation information bit 512 (e.g., USB (bit=0), LSB (bit=1), in FIG. 6; 708 in FIG. 7; 810*a* to 810*n*, 822 in FIG. 8) in the frequency domain.

At 1204, the receiver device receives, from a transmitter device and in accordance with a single sideband reflection, an overlaid modulation information bit based on a shifted first order harmonic, of an associated transmission signal, at a shifted frequency-domain position. As an example, the reception may be performed by one or more of the component 199, the transceiver 1322, and/or the antenna 1380 in FIG. 13, and/or the transceiver 1446, and/or the antenna 1480 in FIG. 14. FIG. 5 illustrates an example of the receiver device (e.g., the receiver device 504) receiving such an overlaid modulation information bit from a transmitter device (e.g., the transmitter device 502).

The receiver device 504 may be configured to receive, from the transmitter device 502 and in accordance with the single sideband reflection, the overlaid modulation information bit 512 (e.g., USB (bit=0), LSB (bit=1), in FIG. 6; 708 in FIG. 7; 810*a* to 810*n*, 822 in FIG. 8) based on the shifted first order harmonic, of the associated transmission signal, at the shifted frequency-domain position (e.g., $$-\sum_{\ell=1,5,\ldots}^{\infty} ja_\ell Y\left(f \pm \frac{\ell}{T_m}\right)$$

for l=1, for FIG. 6). In aspects, the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) may be based on a one-quarter period shift (e.g., 650: 622 in FIG. 6), of the time period of the associated transmission signal (e.g., 602 in FIG. 6), that corresponds to an USB. In other aspects, the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) may be based on a three-quarters period shift (e.g., 650: 623 in FIG. 6), of the time period of the associated transmission signal (e.g., 602 in FIG. 6), that corresponds to a LSB. In aspects, the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) corresponds to a USB associated with the value of zero for the information bit 516, while in other aspects the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) corresponds to a LSB associated with a value of one for the information bit 516. In aspects, to receive, from the transmitter device 502 and in accordance with the single sideband reflection, the overlaid modulation information bit 512 (e.g., USB (bit=0), LSB (bit=1), in FIG. 6; 708 in FIG. 7; 810*a* to 810*n*, 822 in FIG. 8), the receiver device 504 may be configured to receive the overlaid modulation information bit 512 (e.g., USB (bit=0), LSB (bit=1), in FIG. 6; 708 in FIG. 7; 810*a* to 810*n*, 822 in FIG. 8) via a network node (e.g., 705 in FIG. 7) by backscattering. In such aspects, the receiver device 504 may be configured to receive the overlaid modulation information bit 512 (e.g., USB (bit=0), LSB (bit=1), in FIG. 6; 708 in FIG. 7; 810*a* to 810*n*, 822 in FIG. 8) via the network node (e.g., 705 in FIG. 7) by backscattering based on a modulation configuration (e.g., 706 in FIG. 7) of the network node (e.g., 705 in FIG. 7) that is associated with the shifted frequency-domain position (e.g., $$-\sum_{\ell=1,5,\ldots}^{\infty} ja_\ell Y\left(f \pm \frac{\ell}{T_m}\right)$$

for l=1, for FIG. 6). In some aspects, to receive, from the transmitter device 502 and in accordance with the single sideband reflection, the overlaid modulation information bit 512 (e.g., USB (bit=0), LSB (bit=1), in FIG. 6; 708 in FIG. 7; 810*a* to 810*n*, 822 in FIG. 8), the receiver device 504 may be configured to receive, from the transmitter device 502, a DSB indication (e.g., 806 in FIG. 8) indicative of DSB transmissions (e.g., 808, 812 in FIG. 8) being associated with at least one of an initiation or a termination of overlaid modulation information bits (e.g., USB (bit=0), LSB (bit=1), in FIG. 6; 708 in FIG. 7; 810*a* to 810*n*, 822 in FIG. 8) (e.g., inclusive of the overlaid modulation information bit 512) in accordance with the single sideband reflection (e.g., at 710 in FIG. 7). In such aspects, the receiver device 504 may also be configured to receive, from the transmitter device 502, a first DSB transmission (e.g., 808 in FIG. 8) indicative of the initiation, and to transmit the overlaid modulation information bit 512 (e.g., USB (bit=0), LSB (bit=1), in FIG. 6; 708 in FIG. 7; 810*a* to 810*n*, 822 in FIG. 8) subsequent to the first DSB transmission (e.g., 808 in FIG. 8). In other such aspects, the transmitter device 502 may also be configured to receive, from the transmitter device 502, a second DSB transmission (e.g., 812 in FIG. 8) indicative of the termination, and to transmit the overlaid modulation information bit 512 (e.g., USB (bit=0), LSB (bit=1), in FIG. 6; 708 in FIG. 7; 810*a* to 810*n*, 822 in FIG. 8) prior to the second DSB transmission (e.g., 812 in FIG. 8). In some aspects, to receive, from the transmitter device 502 and in accordance with the single sideband reflection (e.g., at 710 in FIG. 7), the overlaid modulation information bit 512 (e.g., USB (bit=0), LSB (bit=1), in FIG. 6; 708 in FIG. 7; 810*a* to 810*n*, 822 in FIG. 8), the receiver device 504 may be configured to receive a harmonics indication (e.g., 820 in FIG. 8) indicative of at least one higher-order harmonic (e.g., 822*a* to 822*n* in FIG. 8) associated with the associated transmission signal (e.g., 602 in FIG. 6), and to receive the at least one higher-order harmonic associated with the associated transmission signal (e.g., 602 in FIG. 6) at the shifted frequency-domain position (e.g., $$-\sum_{\ell=1,5,\ldots}^{\infty} ja_\ell Y\left(f \pm \frac{\ell}{T_m}\right)$$

for l=1, for FIG. 6).

At 1206, the receiver device decodes, based on the shifted frequency-domain position for the shifted first order harmonic, the overlaid modulation information bit in association with time-domain modulated information to generate an information bit. As an example, the decode may be performed by one or more of the component 199, the transceiver 1322, and/or the antenna 1380 in FIG. 13, and/or the transceiver 1446, and/or the antenna 1480 in FIG. 14. FIG. 5 illustrates an example of the receiver device (e.g., the receiver device 504) decoding such an overlaid modulation information bit to generate an information bit.

The receiver device 504 may be configured to decode (at 514), based on the shifted frequency-domain position (e.g., $$-\sum_{\ell=1,5,\ldots}^{\infty} ja_\ell Y\left(f \pm \frac{\ell}{T_m}\right)$$

for l=1, for FIG. 6) for the shifted first order harmonic (e.g., 660, 662 in FIG. 6), the overlaid modulation information bit 512 (e.g., USB (bit=0), LSB (bit=1), in FIG. 6; 708 in FIG. 7; 810*a* to 810*n*, 822 in FIG. 8) in association with time-domain modulated information (e.g., 709 in FIG. 7) to generate 516 the information bit 516 (e.g., that was encoded (at 510) by the transmitter device 502).

Figure 13:
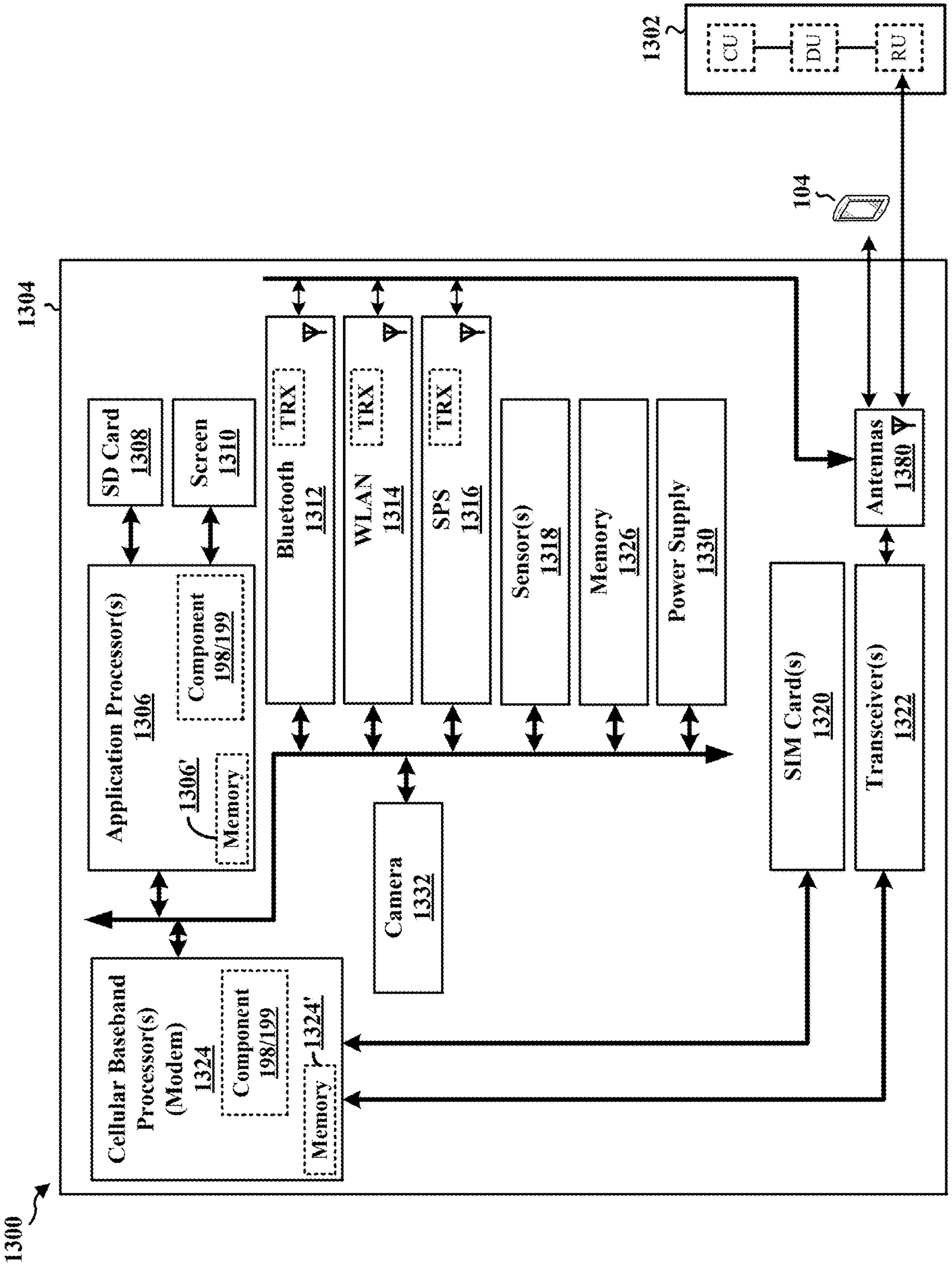
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor (s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304. The apparatus 1304 may include the component 198 and/or the component 199.

As discussed supra, the component 198 may be configured to shift a first order harmonic, with respect to an associated transmission signal, to a shifted frequency-domain position. The component 198 may be configured to encode, based on the shifted frequency-domain position for the first order harmonic, an information bit over time-domain modulated information to generate an overlaid modulation information bit. The component 198 may be configured to transmit, for a receiver device and in accordance with a single sideband reflection, the overlaid modulation information bit. The component 198 may be configured to transmit, for the receiver device and prior to the overlaid modulation information bit, an overlaid modulation indication indicative of a future transmission of the overlaid modulation information bit. The component 198 may be configured to transmit, for a network node and prior to the overlaid modulation information bit, a modulation configuration indication indicative of a modulation configuration associated with the shifted frequency-domain position for a future transmission of the overlaid modulation information bit. As discussed supra, the component 199 may be configured to receive, from a transmitter device and in accordance with a single sideband reflection, an overlaid modulation information bit based on a shifted first order harmonic, of an associated transmission signal, at a shifted frequency-domain position. The component 199 may be configured to decode, based on the shifted frequency-domain position for the shifted first order harmonic, the overlaid modulation information bit in association with time-domain modulated information to generate an information bit. The component 199 may be configured to receive, from the transmitter device and prior to the overlaid modulation information bit, an overlaid modulation indication indicative of a future transmission of the overlaid modulation information bit. The component 198 and/or the component 199 may be further configured to perform any of the aspects described in connection with the flowcharts in any of FIGS. 9, 10, 11, 12 and/or any of the aspects performed by a transmitter/receiver device for any of FIGS. 5-8. The component 198 and/or the component 199 may be within the cellular baseband processor(s) 1324, the application processor(s) 1306, or both the cellular baseband processor(s) 1324 and the application processor(s) 1306. The component 198 and/or the component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for shifting a first order harmonic, with respect to an associated transmission signal, to a shifted frequency-domain position. In one configuration, the apparatus 1304, and in particular the cellular baseband processor(s) 1324 and/or the application processor (s) 1306, may include means for encoding, based on the shifted frequency-domain position for the first order harmonic, an information bit over time-domain modulated information to generate an overlaid modulation information bit. In one configuration, the apparatus 1304, and in particular the cellular baseband processor(s) 1324 and/or the application processor(s) 1306, may include means for transmitting, for a receiver device and in accordance with a single sideband reflection, the overlaid modulation information bit. In one configuration, the apparatus 1304, and in particular the cellular baseband processor(s) 1324 and/or the application processor(s) 1306, may include means for transmitting, for the receiver device and prior to the overlaid modulation information bit, an overlaid modulation indication indicative of a future transmission of the overlaid modulation information bit. In one configuration, the apparatus 1304, and in particular the cellular baseband processor(s) 1324 and/or the application processor(s) 1306, may include means for transmitting, for a network node and prior to the overlaid modulation information bit, a modulation configuration indication indicative of a modulation configuration associated with the shifted frequency-domain position for a future transmission of the overlaid modulation information bit. In one configuration, the apparatus 1304, and in particular the cellular baseband processor(s) 1324 and/or the application processor(s) 1306, may include means for receiving, from a transmitter device and in accordance with a single sideband reflection, an overlaid modulation information bit based on a shifted first order harmonic, of an associated transmission signal, at a shifted frequency-domain position. In one configuration, the apparatus 1304, and in particular the cellular baseband processor(s) 1324 and/or the application processor (s) 1306, may include means for decoding, based on the shifted frequency-domain position for the shifted first order harmonic, the overlaid modulation information bit in association with time-domain modulated information to generate an information bit. In one configuration, the apparatus 1304, and in particular the cellular baseband processor(s) 1324 and/or the application processor(s) 1306, may include means for receiving, from the transmitter device and prior to the overlaid modulation information bit, an overlaid modulation indication indicative of a future transmission of the overlaid modulation information bit. The means may be the component 198 and/or the component 199 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
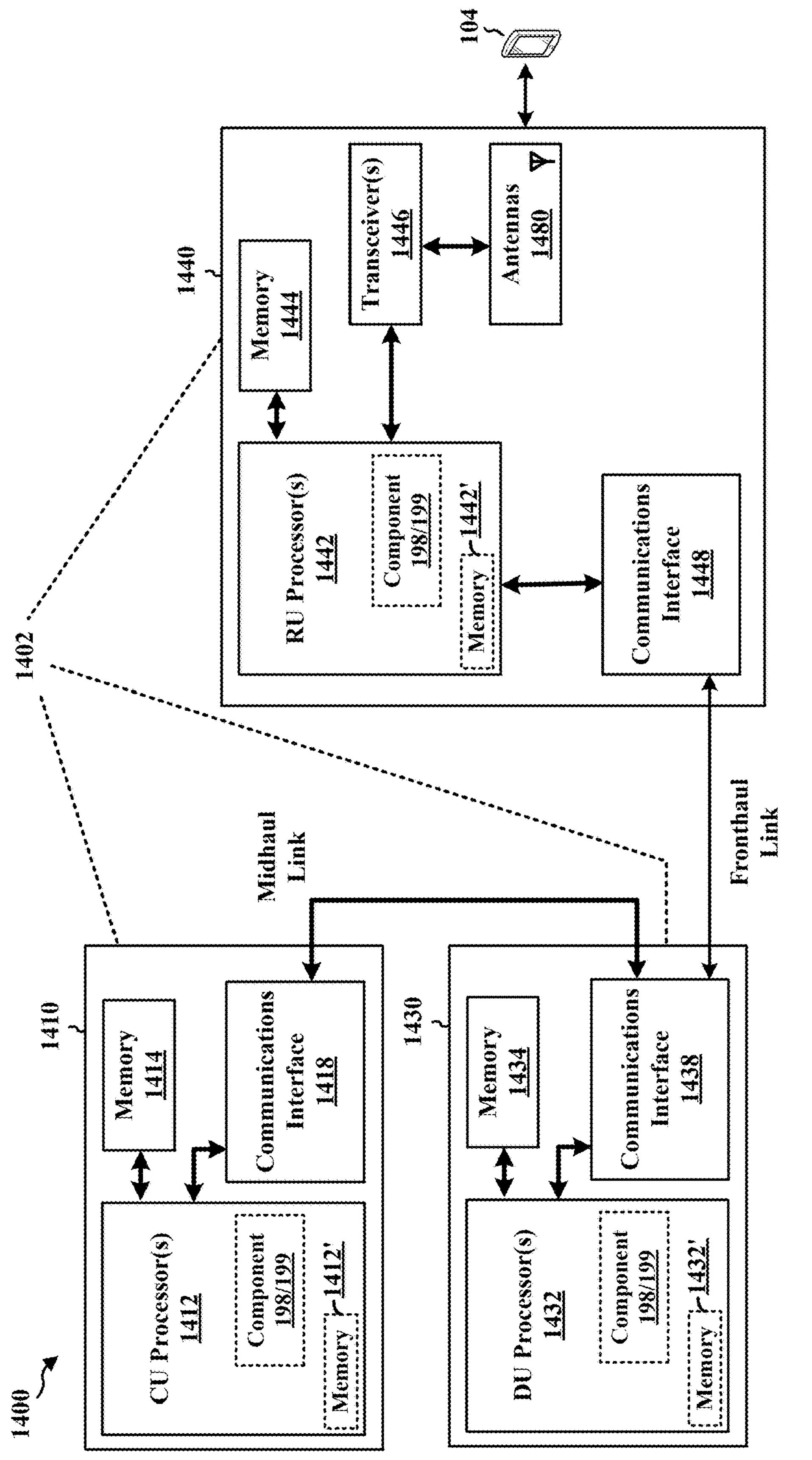
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 198/the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to shift a first order harmonic, with respect to an associated transmission signal, to a shifted frequency-domain position. The component 198 may be configured to encode, based on the shifted frequency-domain position for the first order harmonic, an information bit over time-domain modulated information to generate an overlaid modulation information bit. The component 198 may be configured to transmit, for a receiver device and in accordance with a single sideband reflection, the overlaid modulation information bit. The component 198 may be configured to transmit, for the receiver device and prior to the overlaid modulation information bit, an overlaid modulation indication indicative of a future transmission of the overlaid modulation information bit. The component 198 may be configured to transmit, for a network node and prior to the overlaid modulation information bit, a modulation configuration indication indicative of a modulation configuration associated with the shifted frequency-domain position for a future transmission of the overlaid modulation information bit. As discussed supra, the component 199 may be configured to receive, from a transmitter device and in accordance with a single sideband reflection, an overlaid modulation information bit based on a shifted first order harmonic, of an associated transmission signal, at a shifted frequency-domain position. The component 199 may be configured to decode, based on the shifted frequency-domain position for the shifted first order harmonic, the overlaid modulation information bit in association with time-domain modulated information to generate an information bit. The component 199 may be configured to receive, from the transmitter device and prior to the overlaid modulation information bit, an overlaid modulation indication indicative of a future transmission of the overlaid modulation information bit. The component 198 and/or the component 199 may be further configured to perform any of the aspects described in connection with the flowcharts in any of FIGS. 9, 10, 11, 12 and/or any of the aspects performed by a transmitter/receiver device for any of FIGS. 5-8. The component 198 and/or the component 199 may be within one or more processors of one or more of the CU 1410, DU 1430, and the RU 1440. The component 198 and/or the component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 may include means for shifting a first order harmonic, with respect to an associated transmission signal, to a shifted frequency-domain position. In one configuration, the network entity 1402 may include means for encoding, based on the shifted frequency-domain position for the first order harmonic, an information bit over time-domain modulated information to generate an overlaid modulation information bit. In one configuration, the network entity 1402 may include means for transmitting, for a receiver device and in accordance with a single sideband reflection, the overlaid modulation information bit. In one configuration, the network entity 1402 may include means for transmitting, for the receiver device and prior to the overlaid modulation information bit, an overlaid modulation indication indicative of a future transmission of the overlaid modulation information bit. In one configuration, the network entity 1402 may include means for transmitting, for a network node and prior to the overlaid modulation information bit, a modulation configuration indication indicative of a modulation configuration associated with the shifted frequency-domain position for a future transmission of the overlaid modulation information bit. In one configuration, the network entity 1402 may include means for receiving, from a transmitter device and in accordance with a single sideband reflection, an overlaid modulation information bit based on a shifted first order harmonic, of an associated transmission signal, at a shifted frequency-domain position. In one configuration, the network entity 1402 may include means for decoding, based on the shifted frequency-domain position for the shifted first order harmonic, the overlaid modulation information bit in association with time-domain modulated information to generate an information bit. In one configuration, the network entity 1402 may include means for receiving, from the transmitter device and prior to the overlaid modulation information bit, an overlaid modulation indication indicative of a future transmission of the overlaid modulation information bit. The means may be the component 198 and/or the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

RM is a technique for various low-power or battery-less network nodes leveraging backscattering communication principles, e.g., A-IoT tags or RISs. Some examples may perform RM by periodic waveforms which govern switching patterns of the antenna loads and induce the desired phase shift on the reflected wave. Other examples of RM may map data to subcarrier indices and shift spectrums accordingly by adjusting the chip rate. However, changes in chip rates and expenditures of excess energy associated with harmonic frequencies above the first order in existing solutions reduces efficiency in RM. The above examples lack single sideband reflection techniques for reflection nodes to eliminate image tones of first order harmonics and provide RM without changes in chip rates.

Aspects herein for overlaid frequency-domain reflection modulation provide for overlaying information bits in existing time domain modulations by utilizing the location of a first order harmonic for waveforms (e.g., left-shifted/LSB or right-shifted/USB) of the original spectrum, provide for eliminating image tones of first order harmonics and reducing power consumption utilizing frequency-shifts through harmonic frequencies, and provide for retrieving modulated bits in the frequency domain by a receiver device, while still performing demodulation in the time domain to retrieve other bits for its underlying RM scheme in the time domain, by encoding additional bits on top of existing time-domain modulation scheme in an overlaid fashion by a transmitter device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor (i.e., a set of one or more processors P) is configured to perform a set of functions F, each processor of P may be configured to perform a subset S of F, where S S F. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication at a transmitter device, comprising: shifting a first order harmonic, with respect to an associated transmission signal, to a shifted frequency-domain position; encoding, based on the shifted frequency-domain position for the first order harmonic, an information bit over time-domain modulated information to generate an overlaid modulation information bit; and transmitting, for a receiver device and in accordance with a single sideband reflection, the overlaid modulation information bit.

Aspect 2 is the method of aspect 1, wherein the shifted frequency-domain position is based on a one-quarter period shift, of a time period of the associated transmission signal, that corresponds to an upper sideband (USB).

Aspect 3 is the method of aspect 1, wherein the shifted frequency-domain position is based on a three-quarters period shift, of a time period of the associated transmission signal, that corresponds to a lower sideband (LSB).

Aspect 4 is the method of any of aspects 1 to 3, wherein the shifted frequency-domain position corresponds to an upper sideband (USB) and indicates a value of zero for the information bit; or wherein the shifted frequency-domain position corresponds to a lower sideband (LSB) and indicates a value of one for the information bit.

Aspect 5 is the method of any of aspects 1 to 4, further comprising: transmitting, for the receiver device and prior to the overlaid modulation information bit, an overlaid modulation indication indicative of a future transmission of the overlaid modulation information bit.

Aspect 6 is the method of any of aspects 1 to 5, further comprising: transmitting, for a network node and prior to the overlaid modulation information bit, a modulation configuration indication indicative of a modulation configuration associated with the shifted frequency-domain position for a future transmission of the overlaid modulation information bit.

Aspect 7 is the method of any of aspects 1 to 6, wherein transmitting, for the receiver device and in accordance with the single sideband reflection, the overlaid modulation information bit includes transmitting the overlaid modulation information bit via a network node by backscattering.

Aspect 8 is the method of any of aspects 1 to 7, wherein transmitting, for the receiver device and in accordance with the single sideband reflection, the overlaid modulation information bit includes: transmitting, for the receiver device, a double sideband (DSB) indication indicative of DSB transmissions being associated with at least one of an initiation or a termination of overlaid modulation information bits in accordance with the single sideband reflection; and at least one of: transmitting, for the receiver device, a first DSB transmission indicative of the initiation, and transmitting the overlaid modulation information bit subsequent to the first DSB transmission; or transmitting, for the receiver device, a second DSB transmission indicative of the termination, and transmitting the overlaid modulation information bit prior to the second DSB transmission.

Aspect 9 is the method of any of aspects 1 to 8, wherein transmitting, for the receiver device and in accordance with the single sideband reflection, the overlaid modulation information bit includes: transmitting a harmonics indication indicative of at least one higher-order harmonic associated with the associated transmission signal; and transmitting the at least one higher-order harmonic associated with the associated transmission signal at the shifted frequency-domain position.

Aspect 10 is the method of any of aspects 1 to 9, wherein the transmitter device is at least one of a first user equipment (UE), a first Internet-of-Things (IoT) device, a first active network node, or a first passive network node, and wherein the receiver device is at least one of a second UE, a second active network node, or a second IoT device.

Aspect 11 is a method for wireless communication at a receiver device, comprising: receiving, from a transmitter device and in accordance with a single sideband reflection, an overlaid modulation information bit based on a shifted first order harmonic, of an associated transmission signal, at a shifted frequency-domain position; and decoding, based on the shifted frequency-domain position for the shifted first order harmonic, the overlaid modulation information bit in association with time-domain modulated information to generate an information bit.

Aspect 12 is the method of aspect 11, wherein the shifted frequency-domain position is based on a one-quarter period shift, of a time period of the associated transmission signal, that corresponds to an upper sideband (USB).

Aspect 13 is the method of aspect 11, wherein the shifted frequency-domain position is based on a three-quarters period shift, of a time period of the associated transmission signal, that corresponds to a lower sideband (LSB).

Aspect 14 is the method of any of aspects 11 to 13, wherein the shifted frequency-domain position corresponds to an upper sideband (USB) associated with a value of zero for the information bit; or wherein the shifted frequency-domain position corresponds to a lower sideband (LSB) associated with a value of one for the information bit.

Aspect 15 is the method of any of aspects 11 to 14, further comprising: receiving, from the transmitter device and prior to the overlaid modulation information bit, an overlaid modulation indication indicative of a future transmission of the overlaid modulation information bit.

Aspect 16 is the method of any of aspects 11 to 15, wherein receiving, from the transmitter device and in accordance with the single sideband reflection, the overlaid modulation information bit includes receiving the overlaid modulation information bit via a network node by backscattering.

Aspect 17 is the method of aspect 16, wherein receiving the overlaid modulation information bit via the network node by backscattering includes receiving the overlaid modulation information bit via the network node by backscattering based on a modulation configuration of the network node that is associated with the shifted frequency-domain position.

Aspect 18 is the method of any of aspects 11 to 17, wherein receiving, from the transmitter device and in accordance with the single sideband reflection, the overlaid modulation information bit includes: receiving, from the transmitter device, a double sideband (DSB) indication indicative of DSB transmissions being associated with at least one of an initiation or a termination of overlaid modulation information bits in accordance with the single sideband reflection; and at least one of: receiving, from the transmitter device, a first DSB transmission indicative of the initiation, and receiving the overlaid modulation information bit subsequent to the first DSB transmission; or receiving, from the transmitter device, a second DSB transmission indicative of the termination, and receiving the overlaid modulation information bit prior to the second DSB transmission.

Aspect 19 is the method of any of aspects 11 to 18, wherein receiving, from the transmitter device and in accordance with the single sideband reflection, the overlaid modulation information bit includes: receiving a harmonics indication indicative of at least one higher-order harmonic associated with the associated transmission signal, and receiving the at least one higher-order harmonic associated with the associated transmission signal at the shifted frequency-domain position.

Aspect 20 is the method of any of aspects 11 to 19, wherein the transmitter device is at least one of a first user equipment (UE), a first Internet-of-Things (IoT) device, a first active network node, or a first passive network node, and wherein the receiver device is at least one of a second UE, a second active network node, or a second IoT device.

Aspect 21 is an apparatus for wireless communication at a transmitter device, comprising: at least one memory; and at least one processor coupled to the at least one memory, the at least one processor is configured to perform the method of any of aspects 1 to 10.

Aspect 22 is an apparatus for wireless communication at a transmitter device, comprising means for performing each step in the method of any of aspects 1 to 10.

Aspect 23 is the apparatus of any of aspects 21 to 22, further comprising a transceiver configured to receive or to transmit in association with the method of any of aspects 1 to 10.

Aspect 24 is a computer-readable medium storing computer executable code at a transmitter device, the code when executed by at least one processor causes the at least one processor to perform the method of any of aspects 1 to 10.

Aspect 25 is an apparatus for wireless communication at a receiver device, comprising: at least one memory; and at least one processor coupled to the at least one memory, the at least one processor is configured to perform the method of any of aspects 11 to 20.

Aspect 26 is an apparatus for wireless communication at a receiver device, comprising means for performing each step in the method of any of aspects 11 to 20.

Aspect 27 is the apparatus of any of aspects 25 to 26, further comprising a transceiver configured to receive or to transmit in association with the method of any of aspects 11 to 20.

Aspect 28 is a computer-readable medium storing computer executable code at a receiver device, the code when executed by at least one processor causes the at least one processor to perform the method of any of aspects 11 to 20.

What is claimed is:

1. An apparatus of wireless communication at a transmitter device, comprising:

at least one memory; and at least one processor coupled to the at least one memory and, based at least in part on information stored in the at least one memory, the at least one processor is configured to:

shift a first order harmonic, with respect to an associated transmission signal, to a shifted frequency-domain position;

encode, based on the shifted frequency-domain position for the first order harmonic, an information bit over time-domain modulated information to generate an overlaid modulation information bit; and transmit, for a receiver device and in accordance with a single sideband reflection, the overlaid modulation information bit.

2. The apparatus of claim 1, wherein the shifted frequency-domain position is based on a one-quarter period shift, of a time period of the associated transmission signal, that corresponds to an upper sideband (USB).

3. The apparatus of claim 1, wherein the shifted frequency-domain position is based on a three-quarters period shift, of a time period of the associated transmission signal, that corresponds to a lower sideband (LSB).

4. The apparatus of claim 1, wherein the shifted frequency-domain position corresponds to an upper sideband (USB) and indicates a value of zero for the information bit; or wherein the shifted frequency-domain position corresponds to a lower sideband (LSB) and indicates a value of one for the information bit.

5. The apparatus of claim 1, wherein the at least one processor is further configured to:

transmit, for the receiver device and prior to the overlaid modulation information bit, an overlaid modulation indication indicative of a future transmission of the overlaid modulation information bit.

6. The apparatus of claim 1, wherein the at least one processor is further configured to:

transmit, for a network node and prior to the overlaid modulation information bit, a modulation configuration indication indicative of a modulation configuration associated with the shifted frequency-domain position for a future transmission of the overlaid modulation information bit.

7. The apparatus of claim 1, wherein to transmit, for the receiver device and in accordance with the single sideband reflection, the overlaid modulation information bit, the at least one processor is configured to transmit the overlaid modulation information bit via a network node by backscattering.

8. The apparatus of claim 1, wherein to transmit, for the receiver device and in accordance with the single sideband reflection, the overlaid modulation information bit, the at least one processor is configured to:

transmit, for the receiver device, a double sideband (DSB) indication indicative of DSB transmissions being associated with at least one of an initiation or a termination of overlaid modulation information bits in accordance with the single sideband reflection; and at least one of:

transmit, for the receiver device, a first DSB transmission indicative of the initiation, and transmit the overlaid modulation information bit subsequent to the first DSB transmission; or transmit, for the receiver device, a second DSB transmission indicative of the termination, and transmit the overlaid modulation information bit prior to the second DSB transmission.

9. The apparatus of claim 1, wherein to transmit, for the receiver device and in accordance with the single sideband reflection, the overlaid modulation information bit, the at least one processor is configured to:

transmit a harmonics indication indicative of at least one higher-order harmonic associated with the associated transmission signal; and transmit the at least one higher-order harmonic associated with the associated transmission signal at the shifted frequency-domain position.

10. The apparatus of claim 1, wherein the transmitter device is at least one of a first user equipment (UE), a first Internet-of-Things (IoT) device, a first active network node, or a first passive network node, and wherein the receiver device is at least one of a second UE, a second active network node, or a second IoT device.

11. The apparatus of claim 1, further comprising at least one transceiver coupled to the at least one processor, wherein to transmit, for the receiver device and in accordance with the single sideband reflection, the overlaid modulation information bit, the at least one processor is configured to transmit, for the receiver device and in accordance with the single sideband reflection, the overlaid modulation information bit via the at least one transceiver.

12. A method for wireless communication at a transmitter device, comprising:

shifting a first order harmonic, with respect to an associated transmission signal, to a shifted frequency-domain position;

encoding, based on the shifted frequency-domain position for the first order harmonic, an information bit over time-domain modulated information to generate an overlaid modulation information bit; and transmitting, for a receiver device and in accordance with a single sideband reflection, the overlaid modulation information bit.

13. The method of claim 12, wherein the shifted frequency-domain position is based on a one-quarter period shift, of a time period of the associated transmission signal, that corresponds to an upper sideband (USB); or wherein the shifted frequency-domain position is based on a three-quarters period shift, of a time period of the associated transmission signal, that corresponds to a lower sideband (LSB).

14. The method of claim 12, wherein the shifted frequency-domain position corresponds to an upper sideband (USB) and indicates a value of zero for the information bit; or wherein the shifted frequency-domain position corresponds to a lower sideband (LSB) and indicates a value of one for the information bit.

15. The method of claim 12, further comprising at least one of:

transmitting, for the receiver device and prior to the overlaid modulation information bit, an overlaid modulation indication indicative of a future transmission of the overlaid modulation information bit; or transmitting, for a network node and prior to the overlaid modulation information bit, a modulation configuration indication indicative of a modulation configuration associated with the shifted frequency-domain position for a future transmission of the overlaid modulation information bit.

16. An apparatus of wireless communication at a receiver device, comprising:

at least one memory; and at least one processor coupled to the at least one memory and, based at least in part on information stored in the at least one memory, the at least one processor is configured to:

receive, from a transmitter device and in accordance with a single sideband reflection, an overlaid modulation information bit based on a shifted first order harmonic, of an associated transmission signal, at a shifted frequency-domain position; and decode, based on the shifted frequency-domain position for the shifted first order harmonic, the overlaid modulation information bit in association with time-domain modulated information to generate an information bit.

17. The apparatus of claim 16, wherein the shifted frequency-domain position is based on a one-quarter period shift, of a time period of the associated transmission signal, that corresponds to an upper sideband (USB).

18. The apparatus of claim 16, wherein the shifted frequency-domain position is based on a three-quarters period shift, of a time period of the associated transmission signal, that corresponds to a lower sideband (LSB).

19. The apparatus of claim 16, wherein the shifted frequency-domain position corresponds to an upper sideband (USB) associated with a value of zero for the information bit; or wherein the shifted frequency-domain position corresponds to a lower sideband (LSB) associated with a value of one for the information bit.

20. The apparatus of claim 16, wherein the at least one processor is further configured to:

receive, from the transmitter device and prior to the overlaid modulation information bit, an overlaid modulation indication indicative of a future transmission of the overlaid modulation information bit.

21. The apparatus of claim 16, wherein to receive, from the transmitter device and in accordance with the single sideband reflection, the overlaid modulation information bit, the at least one processor is configured to receive the overlaid modulation information bit via a network node by backscattering.

22. The apparatus of claim 21, wherein to receive the overlaid modulation information bit via the network node by backscattering, the at least one processor is configured to receive the overlaid modulation information bit via the network node by backscattering based on a modulation configuration of the network node that is associated with the shifted frequency-domain position.

23. The apparatus of claim 16, wherein to receive, from the transmitter device and in accordance with the single sideband reflection, the overlaid modulation information bit, the at least one processor is configured to:

receive, from the transmitter device, a double sideband (DSB) indication indicative of DSB transmissions being associated with at least one of an initiation or a termination of overlaid modulation information bits in accordance with the single sideband reflection; and at least one of:

receive, from the transmitter device, a first DSB transmission indicative of the initiation, and receive the overlaid modulation information bit subsequent to the first DSB transmission; or receive, from the transmitter device, a second DSB transmission indicative of the termination, and receive the overlaid modulation information bit prior to the second DSB transmission.

24. The apparatus of claim 16, wherein to receive, from the transmitter device and in accordance with the single sideband reflection, the overlaid modulation information bit, the at least one processor is configured to:

receive a harmonics indication indicative of at least one higher-order harmonic associated with the associated transmission signal, and receive the at least one higher-order harmonic associated with the associated transmission signal at the shifted frequency-domain position.

25. The apparatus of claim 16, wherein the transmitter device is at least one of a first user equipment (UE), a first Internet-of-Things (IoT) device, a first active network node, or a first passive network node, and wherein the receiver device is at least one of a second UE, a second active network node, or a second IoT device.

26. The apparatus of claim 16, further comprising at least one transceiver coupled to the at least one processor, wherein to receive, from the transmitter device and in accordance with the single sideband reflection, the overlaid modulation information bit based on the shifted first order harmonic, of the associated transmission signal, at the shifted frequency-domain position, the at least one processor is configured to receive, from the transmitter device and in accordance with the single sideband reflection, the overlaid modulation information bit via the at least one transceiver.

27. A method for wireless communication at a receiver device, comprising:

receiving, from a transmitter device and in accordance with a single sideband reflection, an overlaid modulation information bit based on a shifted first order harmonic, of an associated transmission signal, at a shifted frequency-domain position; and decoding, based on the shifted frequency-domain position for the shifted first order harmonic, the overlaid modulation information bit in association with time-domain modulated information to generate an information bit.

28. The method of claim 27, wherein the shifted frequency-domain position is based on a one-quarter period shift, of a time period of the associated transmission signal, that corresponds to an upper sideband (USB);

wherein the shifted frequency-domain position is based on a three-quarters period shift, of the time period of the associated transmission signal, that corresponds to a lower sideband (LSB).

29. The method of claim 27, wherein the shifted frequency-domain position corresponds to an upper sideband (USB) associated with a value of zero for the information bit; or wherein the shifted frequency-domain position corresponds to a lower sideband (LSB) associated with a value of one for the information bit.

30. The method of claim 27, further comprising:

receiving, from the transmitter device and prior to the overlaid modulation information bit, an overlaid modulation indication indicative of a future transmission of the overlaid modulation information bit.

* * * * *